(12) United States Patent
Dembo

(10) Patent No.: US 9,390,391 B2
(45) Date of Patent: Jul. 12, 2016

(54) SYSTEM AND METHOD FOR BENCHMARKING ENVIRONMENTAL DATA

(71) Applicant: Ron Dembo, Toronto (CA)

(72) Inventor: Ron Dembo, Toronto (CA)

(73) Assignee: ZEROFOOTPRINT SOFTWARE INC., Toronto, Ontario (CA)

( * ) Notice: Subject to any disclaimer, the term of this patent is extended or adjusted under 35 U.S.C. 154(b) by 284 days.

(21) Appl. No.: 13/907,021

(22) Filed: May 31, 2013

(65) Prior Publication Data

US 2013/0268325 A1  Oct. 10, 2013

Related U.S. Application Data

(63) Continuation-in-part of application No. 13/619,051, filed on Sep. 14, 2012, which is a continuation-in-part of application No. 13/601,424, filed on Aug. 31, 2012, which is a continuation-in-part of application No. 13/233,519, filed on Sep. 15, 2011, now abandoned, application No. 13/907,021, which is a continuation-in-part of application No. PCT/CA2012/000853, filed on Sep. 14, 2012, and a continuation-in-part of application No. PCT/CA2012/000800, filed on Aug. 31, 2012, and a continuation-in-part of application No. 13/601,424, filed on Aug. 31, 2012.

(30) Foreign Application Priority Data

Aug. 31, 2012  (CA) ..................................... 27883418
Sep. 14, 2012  (CA) ..................................... 2789863

(51) Int. Cl.
*G06T 11/20* (2006.01)
*G06Q 10/06* (2012.01)

(52) U.S. Cl.
CPC ........ *G06Q 10/06393* (2013.01); *G06T 11/206* (2013.01)

(58) Field of Classification Search
None
See application file for complete search history.

(56) References Cited

U.S. PATENT DOCUMENTS

| | | | | |
|---|---|---|---|---|
| 3,696,808 | A * | 10/1972 | Roy et al. ....................... | 600/544 |
| 6,477,485 | B1 * | 11/2002 | Radulovic et al. ............ | 702/187 |
| 2006/0195254 | A1 * | 8/2006 | Ladetto et al. ................ | 701/207 |
| 2009/0125825 | A1 * | 5/2009 | Rye et al. ....................... | 715/764 |

OTHER PUBLICATIONS

Donnelly ("The Complete Idiot's Guide to Statistics, 2nd Edition", Robert Donnelly, Alpha, May 1, 2007).*

* cited by examiner

*Primary Examiner* — William Beutel
(74) *Attorney, Agent, or Firm* — Norton Rose Fulbright Canada LLP; Maya Medeiros

(57) ABSTRACT

Systems and methods for benchmarking collected or computed environmental data for one or more entities. The systems and methods involve determining a distribution for historical environmental data for the entity, collecting current environmental data for the entity, and generating, using the processor, a graphical representation benchmarking the current environmental data against the historical environmental data, wherein the graphical representation comprises the data segments and represents the current environmental data at a position within one of the segments, where the data segments are calculated using the distribution.

21 Claims, 11 Drawing Sheets

SYSTEM AND METHOD FOR BENCHMARKING ENVIRONMENTAL DATA

CROSS-REFERENCE TO RELATED APPLICATIONS

This application is a continuation-in-part of U.S. application Ser. No. 13/619,051 filed Sep. 14, 2012. U.S. application Ser. No. 13/619,051 is a continuation-in-part of U.S. application Ser. No. 13/601,424 filed Aug. 31, 2012. This application is a continuation-in-part of U.S. application Ser. No. 13/601,424 filed Aug. 31, 2012. U.S. application Ser. No. 13/601,424 is a continuation-in-part of U.S. application Ser. No. 13/233,519 filed on Sep. 15, 2011. This application is a continuation-in-part of International Application No. PCT/CA2012/000853 filed on Sep. 14, 2012. International application No. PCT/CA2012/000853 claims the benefit of Canadian Patent Application No. 2,752,364 filed on Sep. 15, 2011. This application is a continuation-in-part of International Application No. PCT/CA2012/000800 filed on Aug. 31, 2012. International Application No. PCT/CA2012/000800 claims the benefit of Canadian Patent Application No. 2,752,364 filed on Sep. 15, 2011. This application also claims the benefit of Canadian Patent Application No. 2,789,863 filed Sep. 14, 2012 and Canadian Patent Application No. 2,788,302 filed Aug. 31, 2012.

FIELD

The embodiments described herein relate to systems and methods for benchmarking data, and in particular, to systems and methods for benchmarking of environmental data for an entity such as an individual, building, organization, and the like.

INTRODUCTION

Different entities such as governments, industries, organizations, and individuals may want to benchmark their environmental data, such as data relating to resource consumption, data related to generating emissions, data related to health activities, and the like. Benchmarking may involve comparing data from different entities to best practices. For example, an organization may benchmark environmental data for their organization against industry standards or best practices to see if they are higher or lower than the industry standards or best practices. Benchmarking may bring awareness to the organization in order to change the organization's behavior and improve their practices with respect to consumption and emissions. Given the wide variety of consumption data, emissions data, other environmental data, environmental protocols, emission intensities, and activities that produce emissions or consume resources, the reporting, benchmarking and management of environmental data can be an arduous and complex task. There exists a need for improved methods and systems for benchmarking environmental data.

SUMMARY

In a first aspect, embodiments described herein provide a method for benchmarking environmental data for an entity, where the method is implemented by a processor and a storage device storing instructions, the instructions being executable to configure the processor to perform operations comprising: determining a distribution for historical environmental data for the entity, wherein the historical environmental data comprise a plurality of historical data values, wherein each of the plurality of historical data values is associated with a time interval and a date; collecting current environmental data for the entity, wherein the current environmental data comprises a current data value for the time interval; calculating data segments, wherein the data segments are calculated based on the distribution of the historical environmental data; and generating, using the processor, a graphical user interface for display on a device, wherein the graphical user display comprises a graphical representation benchmarking the current environmental data against the historical environmental data, wherein the graphical representation comprises the data segments and represents the current environmental data at a position within one of the data segments.

In accordance with some embodiments, the historical and current environmental data relate to resource consumption by the entity and wherein the plurality of historical data values and the current data value comprises consumption values.

In accordance with some embodiments, the historical and current environmental data relate to emission generation by the entity and wherein the plurality of historical data values and the current data value comprises emission activity data.

In accordance with some embodiments, determining a distribution for the historical environmental data may comprise estimating a mean and a standard deviation, and wherein the data segments are calculated using the estimated mean and the estimated standard deviation.

In accordance with some embodiments, the position representing the current environmental data indicates how the current environmental data compares to an estimated mean for the distribution of the historical environmental data.

In accordance with some embodiments, the historical and current environmental data is associated with a data type and a location of the environmental data.

In accordance with some embodiments, the data segments comprise a first data segment representing an average, a second data segment representing a lower than average, and a third data segment representing a higher than average.

In accordance with some embodiments, the mean and the standard deviation are calculated using the plurality of historical data values, and wherein the current data value is represented within one of the data segments.

In accordance with some embodiments, the data segments comprise a first data segment, a second data segment and a third data segment, wherein the first data segment represents environmental data within the approximate range $X(t')<\mu-(0.491)\sigma$, the second data segment represents environmental data within the approximate range $\mu-(0.491)\sigma<X(t')<\mu+(0.491)\sigma$, and the third data segment represents environmental data within the approximate range $X(t')>\mu+(0.491)\sigma$, where $X(t')$ is an environmental data point, $\mu$ is the estimated mean, and $\sigma$ is the estimated standard deviation.

In accordance with some embodiments, determining the distribution for the historical environmental data for the entity may comprise estimating a normal distribution for the historical environmental data.

In accordance with some embodiments, determining the distribution for the historical environmental data for the entity may comprise determining an empirical distribution for the historical environmental data.

In another aspect, embodiments described herein may provide a method for benchmarking environmental data for an entity, the wherein the method is implemented by a processor and a storage device storing instructions, the instructions being executable to configure the processor to perform operations comprising: for each of a plurality of time intervals, determining a distribution for historical environmental data for the entity, wherein the historical environmental data comprises a plurality of historical data values, wherein each of the plurality of historical data values is associated with the respective time interval and a date; collecting current environmental data for the entity, wherein the current environmental data comprises a current data value for the respective time interval; and calculating time interval specific data segments for the respective time interval, wherein the time interval specific segments are calculated based on the distribution of the historical environmental data; determining a position representing the current environmental data within one of the time interval specific data segments for benchmarking the current environmental data against the historical environmental data; generating, using the processor, a graphical user interface for display on a device, wherein the graphical user display comprises a graphical representation benchmarking the current environmental data for all of the plurality of time intervals against the historical environmental data for all of the plurality of time intervals, wherein the graphical representation comprises overall data segments for all of the plurality of time intervals, wherein the graphical representation represents, for each of the plurality of time intervals, the position representing the current environmental data of the respective time interval within one of the overall data segments.

In accordance with some embodiments, the historical and current environmental data relate to resource consumption by the entity and wherein the plurality of historical data values and the current data value comprises consumption values.

In accordance with some embodiments, the historical and current environmental data relate to emission generation by the entity and wherein the plurality of historical data values and the current data value comprises emission activity data.

In accordance with some embodiments, determining a distribution for the historical environmental data may comprise estimating a mean and a standard deviation, and wherein the data segments are calculated using the estimated mean and the estimated standard deviation.

In accordance with some embodiments, for each of the plurality of time intervals, the position representing the current environmental data for the respective time interval may indicate how the current environmental data for the respective time interval compares to an estimated mean of the distribution of the historical environmental data for the respective time interval.

In accordance with some embodiments, the overall data segments and the time interval specific data segments for each of the plurality of time intervals may comprise a first data segment representing a lower than average, a second data segment representing an average, and a third data segment representing a higher than average.

In accordance with some embodiments, the overall data segments and the time interval specific data segments for each of the plurality of time intervals may comprise a first data segment, a second data segment and a third data segment, wherein the first data segment represents environmental data within the range $X(t') \leq \mu-(0.491)\sigma$, the second data segment represents environmental data within the range $\mu-(0.491)\sigma < X(t') \leq \mu+(0.491)\sigma$, and the third data segment represents a environmental activity data within the range $X(t') > \mu+(0.491)\sigma$, where $X(t')$ is an environmental data point, $\mu$ is the estimated mean, and $\sigma$ is the environmental standard deviation.

In accordance with some embodiments, determining the distribution for the historical environmental data for the entity comprises estimating a normal distribution for the historical environmental data.

In accordance with some embodiments, determining the distribution for the historical environmental data for the entity comprises determining an empirical distribution for the historical environmental data.

In another aspect, embodiments described herein may provide a system for benchmarking environmental data for an entity, wherein the system comprises a processor and a storage device storing instructions, the instructions being executable to configure the processor to: determine a distribution for historical environmental data for the entity, wherein the historical environmental data comprise a plurality of historical data values, wherein each of the plurality of data consumption values is associated with a time interval and a date; collect current environmental data for the entity, wherein the current environmental data comprises a current data value for the time interval; calculate data segments, wherein the data segments are calculated using the distribution for the historical environmental data; and generate, using the processor, a graphical user interface for display on a device, wherein the graphical user display comprises a graphical representation benchmarking the current environmental data against the historical environmental data, wherein the graphical representation comprises the data segments and represents the current environmental data at a position within one of the segments.

In accordance with some embodiments, the historical and current environmental data relate to resource consumption by the entity and wherein the plurality of historical data values and the current data value comprises consumption values.

In accordance with some embodiments, the historical and current environmental data relate to emission generation by the entity and wherein the plurality of historical data values and the current data value comprises emission activity data.

In accordance with some embodiments, the processor may be configured to determine a distribution for the historical environmental data by estimating a mean and a standard deviation, and wherein the data segments are calculated using the estimated mean and the estimated standard deviation.

In accordance with some embodiments, the position representing the current environmental data indicates how the current environmental data compares to an estimated mean of the distribution for the historical environmental data.

In accordance with some embodiments, the historical and current environmental data is associated with a data type and a location.

In accordance with some embodiments, the data segments comprise a first data segment representing a lower than average, a second data segment representing an average, and a third data segment representing a higher than average.

In accordance with some embodiments, the data segments comprise a first data segment, a second data segment and a third data segment, wherein the first data segment represents environmental data within the range $X(t') \leq \mu-(0.491)\sigma$, the second data segment represents environmental data within the range $\mu-(0.491)\sigma < X(t') \leq \mu+(0.491)\sigma$, and the third data segment represents environmental data within the range $X(t') > \mu+(0.491)\sigma$, where $X(t')$ is an environmental data point, $\mu$ is the estimated mean, and $\sigma$ is the estimated standard deviation.

In accordance with some embodiments, the processor is configured to determine the distribution for the historical environmental data for the entity by estimating a normal distribution for the historical environmental data.

In accordance with some embodiments, the processor is configured to determine the distribution for the historical environmental data for the entity by determining an empirical distribution for the historical environmental data.

In another aspect, embodiments described herein may provide a non-transitory computer-readable medium upon which a plurality of instructions are stored, the instructions for performing the steps of the methods described herein.

Other aspects and features will become apparent, to those ordinarily skilled in the art, upon review of the following description of some exemplary embodiments.

DRAWINGS

The drawings included herewith are for illustrating various examples of articles, methods, and apparatuses of the present specification and are not intended to limit the scope of what is taught in any way. In the drawings.

Figure 1:
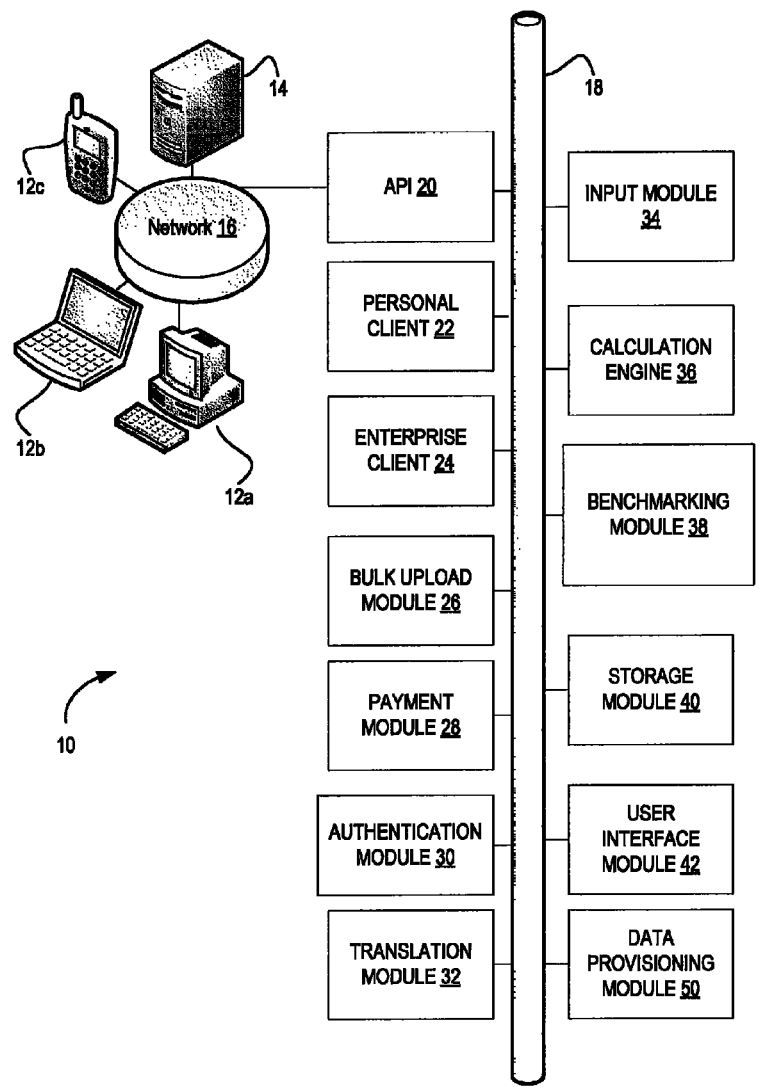
FIG. 1 is a block diagram of a system for benchmarking environmental data according to some embodiments.

The drawings, described below, are for illustration purposes only. The drawings are not intended to limit the scope of the applicants' teachings in anyway. Also, it will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF VARIOUS EMBODIMENTS

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example, and without limitation, the various programmable computers may be a server, network appliance, set-top box, embedded device, computer expansion module, personal computer, laptop, personal data assistant, cellular telephone, smartphone device, UMPC tablets and wireless hypermedia device or any other computing device capable of being configured to carry out the methods described herein.

Program code is applied to input data to perform the functions described herein and to generate output information. The output information is applied to one or more output devices, in known fashion. In some embodiments, the communication interface may be a network communication interface. In embodiments in which elements of the invention are combined, the communication interface may be a software communication interface, such as those for inter-process communication (IPC). In still other embodiments, there may be a combination of communication interfaces implemented as hardware, software, and combination thereof.

Each program may be implemented in a high-level procedural or object oriented programming or scripting language, or both, to communicate with a computer system. However, alternatively the programs may be implemented in assembly or machine language, if desired. The language may be a compiled or interpreted language. Each such computer program may be stored on a storage media or a device (e.g., ROM, magnetic disk, optical disc), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the systems and methods of the described embodiments are capable of being distributed in a computer program product including a physical, non-transitory computer readable medium that bears computer usable instructions for one or more processors. The medium may be provided in various forms, including one or more diskettes, compact disks, tapes, chips, magnetic and electronic storage media, and the like. Non-transitory computer-readable media comprise all computer-readable media, with the exception being a transitory, propagating signal. The term non-transitory is not intended to exclude computer readable media such as a volatile memory or RAM, where the data stored thereon is only temporarily stored. The computer useable instructions may also be in various forms, including compiled and non-compiled code.

Reference is now made to FIG. 1 which illustrates a block diagram of a system for benchmarking environmental data according to some embodiments. System 10 is operable to benchmark current environmental data for an entity (e.g., an individual, organization, building, branch, site) against historical environmental data for the same entity. Current environmental data may be instantaneous real-time data. In some embodiments, current environmental data may also include historical data that is currently of interest to a user in that the user desires to benchmark the data against other historical data for the entity. By benchmarking environmental data for an entity against other environmental data for the same entity system 10 is operable to compare a wide variety of common environment-related data variables, as the benchmarked environmental data sets for the entity will have the same common data variables. In contrast, environmental data for one entity may not have any common variables or a limited number of common variables with respect to environmental data for another entity. That is, one entity may collect and compute different environmental data than another entity and may not have common variables to benchmark.

The environmental data may relate to data for resource consumption by the entity, data for emissions generated by the entity, data for health or fitness activity by the entity, data for socially beneficial activities by the entity, and the like. The environmental data may be raw data, normalized data, processed data, calculated data, and the like. Resource consumption may include water usage, fuel usage, and the like. Resource consumption data may be collected by system 10 as raw activity data related to the entity, as will be described herein. Environmental data may be calculated by system 10 based on raw activity collected for the entity, such as emissions generated by car travel, air travel, and the like. The health or fitness data may be calculated by system 10 based on raw activity data collected for the entity such as miles walked per week, miles biked per month, and the like. The environmental data may be received by system 10 via input module 34 as a historical and real-time data feed or stream. Environmental data may also include data that indirectly relates to the environment, resource consumption, emissions generation, health activities, and so on. For example, environmental data may also include building occupancy rates.

In accordance with embodiments described herein, system 10 is operable to benchmark environmental data for an entity by determining a distribution for historical environmental data for the entity. In accordance with some embodiments, system 10 is operable to assume that the historical environmental data for the entity follows a normal distribution and is operable to estimate the normal distribution for the historical environmental data for the entity. The historical distribution may provide an approximate distribution for the historical environmental data for the entity. System 10 is operable to estimate the normal distribution by estimating a mean and a standard deviation for historical environmental data for the entity.

In accordance with embodiments described herein, system 10 is operable to benchmark environmental data for an entity by determining the empirical (e.g. real, actual) distribution for the historical environmental data. As system 10 collects sufficient environmental data for the entity then system 10 is operable to determine the empirical distribution for the environmental data.

In accordance with embodiments described herein, the historical environmental data for the entity may include raw activity data, normalized activity data, computed emissions values, and on the like, as will further be described herein. For example, the historical environmental data may include historical consumption values, such as energy consumption values or water consumption values. Each of the historical consumption values may be associated with a time interval, such as an hour or 15 minute period, for different dates, such as the days of a week, month, year, and the like. That is, system 10 is operable to collect consumption values (or other types of environmental data values) for a specific time interval over a date range (e.g. collection of different dates).

System 10 is operable to collect current environmental data for the entity using various data collection devices. For the illustrative example, the current environmental data may include a current consumption value for the time interval associated with the historical environmental data in order to bench mark the current environmental data for the time interval on the current day against the historical environmental data for the same time interval but on past dates. For a given time interval, system 10 is operable to generate a graphical representation benchmarking the current environmental data against the historical environmental data. For example, the graphical representation may include three data segments and may represent the current environmental data at a position within one of the three segments.

System 10 may calculate the three data segments based on a distribution of the historical environmental data. In some example embodiments, the distribution may approximated by a normal distribution of the historical environmental data, where the normal distribution of the historical environmental data is calculated using the estimated mean and the estimated standard deviation. The position representing the current environmental data may indicate how the current environmental data compares to the estimated mean. That is, the graphical representation may indicate how the current environmental data differs from the typical environmental data value or average. In other example embodiments, the distribution may be the empirical distribution for the historical environmental data.

System 10 is operable to determine the actual or empirical distribution using the collected historical environmental data. System 10 is operable to divide the set of data points of the historical environmental data into segments in order to generate the graphical representation. System 10 may generate a histogram or order the historical environmental data to divide it into groups or segments. There may be two, three, four, or more segments. For example, the graphical representation may contain three data segments, and system 10 is operable to determine two data points (terciles) that divide the set data points of the historical environmental data into three groups. A tercile is either of the two data points that divide an ordered distribution (e.g. historical environmental data) into three parts. System 10 is operable to determine the two terciles that divide the historical environmental data) into three parts. Each segment may have a different scale or range of data points as will be described herein.

If the benchmarking for an entity is real-time or near-real-time then determining the empirical distribution may utilize a large amount of processing power and introduce latency. Accordingly, in some embodiments, the normal distribution may serve as an approximate distribution for the historical environmental data for the entity. Further, the amount of historical environmental data for a specific time-interval may be limited so the normal distribution may serve as an approximate distribution.

System 10 is operable to create a visual graphical representation to illustrate the benchmarking of the current environmental data against historical environmental data for the entity. The environmental data may relate to resource consumption, emissions generation, fitness activity, socially beneficially activities, cost or other computed or collected environmental data values for the entity.

System 10 includes a processor and a memory storing instructions, the instructions being executable to configure the processor to provide a number of functional elements including: an input module 34, data provisioning module 50, a calculation engine 36, a benchmarking module 38, a storage module 40, and a user interface module 42. An enterprise service bus (ESB) 18 enables asynchronous communication and data exchange between the system 10 components. An application programming interface (API) 20, a personal client 22, and an enterprise client 24 can access the functionality of the benchmarking module 38 and other components directly through the ESB 28. One or more computing devices 12 (which may be embedded with a widget) and a third party server system 14 can access the functionality of the benchmarking module 38 and other components through a network 16 and the API 20. The components of the system 10 are modular and can function independently or together. The components of the system 10 may communicate with the other components through the ESB 18 using messages.

System 10 may be implemented using a server and data storage devices configured with database(s) or file system(s), or using multiple servers or groups of servers distributed over a wide geographic area and connected via a network (e.g. Internet 28). System 10 may reside on any networked computing device including a processor and memory, such as an electronic reading device, a personal computer, workstation, server, portable computer, mobile device, personal digital assistant, laptop, smart phone, WAP phone, an interactive television, video display terminals, gaming consoles, and portable electronic devices or a combination of these. System 10 may include one or more microprocessors that may be any type of processor, such as, for example, any type of general-purpose microprocessor or microcontroller, a digital signal processing (DSP) processor, an integrated circuit, a programmable read-only memory (PROM), or any combination thereof. System 10 may include any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), or the like. System 10 may include one or more input devices, such as a keyboard, mouse, camera, touch screen and a microphone, and may also include one or more output devices such as a display screen and a speaker. System 10 includes a network interface in order to communicate with other components, to serve web pages, and perform other computing applications by connecting to any network(s) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these. Although only system 10 is shown for clarity, there may be multiple systems 10 or groups of systems 10 distributed over a wide geographic area and connected via e.g. network 16.

Network 16 may be any network(s) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, personal network, local area network, wide area network, and others, including any combination of these. Although not shown, computing devices 12 and third party system 14, and API 20 may connect to network 16 via a firewall, which is a device, set of devices or software that inspects network traffic passing through it, and denies or permits passage based on a set of rules and other criteria. Firewall may be adapted to permit, deny, encrypt, decrypt, or proxy all computer traffic between network 16, computing devices 12 and third party system 14, API 20, and other components based upon a set of rules and other criteria. For example, firewall may be a network layer firewall, an application layer firewall, a proxy server, or a firewall with network address translation functionality. Network 16 is operable to secure data transmissions using encryption and decryption.

Computing device 12 and third party server system 14 may be any networked computing device including a processor and memory, such as a personal computer, workstation, server, portable computer, mobile device, personal digital assistant, laptop, smart phone, WAP phone, an interactive television, video display terminals, gaming consoles, an electronic reading device, tablet, and portable electronic devices or a combination of these. Although only three computing devices 12 are illustrated in FIG. 1, there may be more computing devices 12 connected via network 16. Computing devices 12 and third party server system 14 may include a client which may be a computing application, application plug-in, a widget, instant messaging application, mobile device application, e-mail application, online telephony application, java application, web page, or web object residing or rendered on the computing devices 12 and third party server system 14 in order to access the functionality of system 10. Computing devices 12 and third party server system 14 may be different types of devices and may serve one user or multiple users.

The input module 34 is operable to receive environmental data for one or more entities, such as raw activity data, for example. The input module is operable to define a record for an activity using the raw activity data, and associate the activity data with the related entity using an entity identifier, metatag, and the like. The input module 34 is operable to receive historical environmental data and real-time environmental data. The input module 34 is operable to receive instantaneous usage data, data gathered over a period of time, change data, rate of change data, projection data for usage other emission related data. The input module 34 is further operable to receive an entity identifier to associate the environmental data with the user of the system 10.

The input module 34 may receive the environmental data automatically through connectors to or manually through direct user input, spreadsheets defined by templates, supplier bills, the enterprise client 24, the personal client 22, the API 20, and the bulk data upload module 26, for example. The input module 34 may receive the environmental data from a variety of monitoring or sensor devices such as a utility meter, smart meter, water meter, volt meter, amperage meter, light meter, wind meter, hydrometer, pedometer, etc. The input module 34 may be an indirect data capturing system that process images to extract data readings. Input module 34 may poll for environmental data, may periodically request or receive environmental data, or may otherwise receive environmental data related to an entity.

Environmental data may relate to an activity. An activity is an event that generates emissions, consumes resources, or otherwise describes an activity associated with an entity. An activity occurs relative to a geographic location over a defined period of time or a time interval on a specific date. The activity also occurs relative to an entity such as an organization or individual. For example, activity-related data may include a measure relating to the consumption of a resource (e.g., electricity, gasoline, natural gas, water) or the release of an effluent (e.g., mercury or methane) into the environment. An example activity is electricity usage.

The raw activity data defines the record of the activity and may generally include the following data elements: an activity type (e.g., driving, flying, electricity, heating, waste, recycling, composting, and paper) a time interval (e.g., start time, end time); a date; a location where the activity occurred (e.g., Toronto, Mike's office); a unit of measure (e.g., kg, kWh, ton); and a consumption value (e.g., amount of gas consumed).

The raw activity data may further include a cost value and a unit of currency. Additional example activity types include: accommodation, boating, office supplies, household material goods, packaging, shipping, power generation, renewable energy, agricultural applications, refrigerants, food, building materials, public transportation, raw material acquisition, manufacturing, and material processing.

The data elements of the raw activity data may contain sub-data elements or nested data elements. For example, the activity type 'electricity' may have nested data elements such as: grid, green source, on-site, and private contract. The activity type 'heating' may have nested data elements such as: fuel, and electric, cogenerated, and geothermal. The activity type 'flying' may have nested data elements such as: commercial, private leased, and private owned.

The calculation engine 36 is operable to compute emission values for the activity in the event the activity relates to the generation (or reduction) of emissions. The computed emission value is another example of environmental data that may be benchmarked. An emission value may be the amount of emissions for an activity measured in a unit such as watt-hour values for electricity values, tonnes of CO2e (carbon dioxide equivalents), tonnes of CH4e (methane equivalents), and cubic meters of water, for example.

The data provisioning module 50 is operable to store, standardize, validate and classify data received by the system 10 and the input module 34. The data provisioning module 50 ensures data integrity and converts data into common units of measure so that, for example, kilograms are not directly compared to pounds.

When the input module 34 receives raw activity data, the data provisioning module 34 is operable to interact with storage module 40 to store the raw activity data in a data storage device. The data provisioning module 50 may associate the raw activity data with a user identifier. This enables access to a copy of the data as received and allows a user to review their specific input in order to make edits.

The data provisioning module 50 is further operable to convert the raw activity data into standardized activity data and interact with storage module 40 to store the standardized activity data in a data storage device.

The data provisioning module 50 is operable to convert the raw activity data into a standard unit of measure. The data provisioning module 50 is operable to store the original unit of measure for the raw activity data. This allows the data provisioning module 50 to convert system 10 generated data into a unit of measurement appropriate for the data consumer, such as metric measures for Canada and imperial measures for the U.S.

The data provisioning module 50 is further operable to convert the raw activity data into a standard time measure, such as one day. To do so, the data provisioning module 50 may convert the raw activity data for one activity into multiple standardized activities, where the time interval for each standardized activity is the standard time measure. For example, the raw activity data may be an electricity bill for thirty days. The data provisioning module 50 evenly distributes raw activity data for the activity into thirty standardized activities, each having a time interval of one day. The standard time measure may also be one second, one millisecond, etc. for real-time power monitoring systems and the like. The data provisioning module 50 records the standard time measure to allow for subsequent calculations and comparisons.

The data provisioning module 50 is further operable to associate an input label with each standardized activity. The input label provides the system 10 with a context for the standardized activity and defines how the emission value will be calculated. The input label generally depends on the activity type. For example, an input label for the activity type 'driving' may be 'distance driven' and an input label for the activity type 'waste' may be 'waste consumed'.

Benchmarking module 38 is operable to benchmark environmental data for an entity. Benchmarking module 38 is operable to determine a distribution for the historical environmental data in order to segment a graphical representation used for illustrate the benchmarking and position current environmental data within one of the segments. Benchmarking module 38 is operable to determine the empirical distribution for the historical environmental data. Benchmarking module 38 is operable to approximate the distribution for the historical environmental data for the entity using a normal distribution. Benchmarking module 38 is operable to estimate a mean and a standard deviation for historical environmental data for the entity. The historical environmental data includes historical data values (e.g. consumption values) associated with a time interval, over a range of different dates. For example, the historical environmental data may include an historical consumption value for the time interval 9 AM to 10 AM for 90 different days.

Benchmarking module 38 is operable to process current environmental data for the entity, where the current environmental data includes a current data value (e.g. consumption value) for the time interval. Benchmarking module 38 is operable to calculate data segments for a graphical representation of the benchmarking. For example, the graphical representation may include three data segments, one segment for an average, one segment for lower than average, and another segment for higher than average. The three data segments may be calculated by determining tercile data points for the historical environmental data. The three data segments may also be determined based on a normal distribution of the historical environmental data, where the normal distribution of the historical environmental data is calculated using the estimated mean and the estimated standard deviation.

Benchmarking module 38 is operable to determine other quantiles to divide the historical environmental data into different numbers of segments. The quantiles are the data values marking the boundaries between consecutive groups or subsets of the historical environmental data for the entity. The quantiles may be used for dividing ordered historical environmental data into essentially equal or near-equal sized data subsets.

Benchmarking module 38 is operable to generate a graphical user interface for display on a device, where the graphical user display comprises a graphical representation benchmarking the current environmental data against the historical environmental data. The graphical representation is partitioned into data segments and represents the current environmental data at a position within one of the segments. Further details of benchmarking module 38 will be described herein in relation to FIGS. 3 and 4.

Storage module 40 is operable to store and manage environmental data, such as raw activity data, processed activity data records, consumption values, computed emissions values, graphical representations for benchmarking environmental data, and the like. Storage module 40 is operable to tag data with a timestamp and entity identifier. Storage module 40 is operable to discard data if it is corrupt, erroneous, invalid, inconsistent, out of range, or other undesirable.

User interface module 42 is operable to provide graphical representations of benchmarking environmental values for use in generating user interfaces for display via personal client 22 and enterprise client 24. User interface module 42 is operable to receive commands and parameters from personal client 22 and enterprise client 24 to revise graphical representations and provide the revised graphical representations to personal client 22 and enterprise client 24.

Personal client 22 and enterprise client 24 may be used to by an individual or organization to provide and access environmental data from system 10, to receive graphical representations benchmarking current environmental data against historical environmental data, and otherwise access the functionality of system 10.

Bulk upload module 26 is operable to receive raw activity data as bulk data from an enterprise client 24 and provide the raw activity data to the input module 34. A third party system can also interact with bulk upload module 26 for automated bulk data upload into system 10.

In a further embodiment, system 10 includes a payment module 28. Generally, the payment module 28 is operable to: manage an emission credit inventory; calculate a number of emissions credits required to offset the computed emissions value; compute emissions credit market values; and initiate an emissions offset transaction based on the number of calculated emissions credits, computed emissions credit market values, and the emissions credit inventory. Although described as a single module, payment module 28 may be implemented as separate inventory and payment modules.

The payment module 28 is related to the concept of emissions credit markets. For example, at the international level one carbon credit is equal to one tonne of carbon emissions. Once carbon emissions are capped the free market can be used to allocate carbon emissions among regulated sources. The underlying concept is that free market mechanisms will drive industrial and commercial processes towards lower emissions methods. Under such a model governments, industry and individuals could be assigned a pre-determined number of carbon credits based on, for example, current emissions. If an entity reduces its emissions it could sell excess carbon credits on the free market. Conversely, if an entity requires more carbon credits it must purchase them on the free market or face penalties. Similar markets could be established for any type of emissions. The payment module 28 is capable of managing the emissions transactions that arise under such a model. Furthermore, the payment module 28 and the calculation engine 36 can work together to manage a user's emissions credits and related financial transactions based on computed emissions values.

Management of an emissions credit inventory involves tracking the number of emissions credits that a user owns, controls or requires. A user may be given some number of emissions credits by a governmental organization or may be required to purchase credits from an emissions credit bank, marketplace or third party. The user may be able to buy or sell emissions credits at any time. Emissions credits may also take the form of services where suppliers purchase bulk amounts of emissions credits and sell them to customers on demand. Regardless of the form that emissions credit markets take, the payment module 28 is operable to manage the number of emissions credits in a user's emissions credit inventory using accounting practices.

Calculation of the emissions credits required to offset a computed emissions value requires the payment module 28 to convert the emissions value calculated by the calculation engine 36 into the units of measurement used by emissions credits in the emissions credit marketplace. Once the units of measurement are the same the payment module 28 can calculate the number of emissions credits required to offset the calculated emissions value. Once the emissions offset number has been calculated the payment module 28 can compare the offset number to a user's emissions credit inventory.

An emissions offset transaction can be initiated automatically by the payment module 28 if there is a shortfall of emissions credits in a user's emissions credit inventory. An emissions offset transaction can also be initiated manually when a user wishes to purchase or sell emissions credits. An emissions offset transaction allows users to purchase, sell or trade emissions credits via an emissions credit market, an emissions credit supplier, or a third party. For example, assuming the calculation engine 36 calculates that a user's activity has produced 30 tons of CO2 emissions then the payment module 28 is operable to query the user's emissions credit inventory to determine if they have enough emissions credits to cover the emissions debt. If the user only has 20 tons of CO2 credits available in their inventory then the user clearly has a CO2 emissions debt of 10 tons. This debt could be saved in the user's inventory or corrected using an emissions offset transaction.

To associate an emissions offset transaction with a value the payment module 28 is operable to calculate the market value associated with emissions credits. This may involve obtaining pricing information from service providers, thirds parties, or calculating the cost of emissions credits based on market conditions.

The payment module 28 is also operable to process payments relating to emissions values though not necessarily using an emissions credit trading model as described above. Users may wish to purchase other wares or services in order to offset their emissions. For example, an individual may wish to purchase some trees to be planted on their behalf in order to offset a recent flight. These types of transactions can also be processed using the payment module 28.

Authentication module 30 is operable to authenticate a user or input device associated with an entity prior to providing access to system 10 in order to provide input data to system 10 or receive output data from system 10 in order to verify that it is a legitimate user or input device. Authentication module 30 is operable to associate identifiers and passcodes, or other authentication mechanisms in order to authenticate a user or input device associated with an entity.

Translation module 32 is operable to translate and modify the display of text and variant preferences used by any components of the system 10 during user interaction. The translation process may be referred to as internationalization and may extend to concepts such as colors, numbers, fonts, writing conventions, input prompts and the like. Text and variant preferences can be translated and modified automatically using the translation module 32 in response to a locale variable that can be set by a client during use or hard coded into the system 10. In one embodiment, a client side filtering mechanism may be used to read the language preferences of a browser to determine a web client's preferred language and to set the locale variable. The web client would then transmit the locale variable when making requests to other modules. In another embodiment, a client's account information may be stored and accessed by a security service module (not shown) to define a preferred locale. Whenever a client uses the system 10 the security service module could set the users locale.

The actual process of translation may be implemented in many ways. In an exemplary embodiment textual elements are stored as strings in a database for a given locale. The translation module 32 is operable to retrieve the appropriate string from the database in response to a request for a specific string and given a locale. For example, a button labeled "Hello" in English and "Bonjour" in French would be stored as two strings, one with a locale of French and one with a locale of English. The identifier for this string would be the same, for example "hello_button_label". The system, or a client, could therefore make a request to the translation module (54) for "hello_button_label" in locale French, which would return "Bonjour" or in locale English, which would return "Hello". Furthermore, the translation module 32 allows clients to customize locale settings by inserting their own specific translations for strings that take precedence over the base locale settings. Continuing the above example, a company could modify the hello button string so that it reads "Welcome" for the English locale by adding a client customization or by overwriting the string stored in the database for the English locale. All other base translation strings could be left the same for the English locale.

By internationalizing the system 10 using the translation module 32 the user interface elements of the system 10 can easily be adapted for use globally. This would permit, for example, more accurate information gathering using native languages and user interface customs. Internationalizations and resource files can be customized.

The components of system 10 are modular and can function independently or together. The emissions equations, factors, and reference data can be updated, changed, expanded, and tested independently of the other components. The system 10 provides a suite of services to users (commonly referred to as SaaS or software/hardware as a service) and does not require the user to maintain their own software programs, server systems or databases. Components of the system 10 can interact with third party system components instead of the local components (e.g., use a third party reference data component, for example). A third-party system can also interact with the entire system 10 or one or more individual components for automated data exchange and bulk data upload into system 10.

Figure 2:
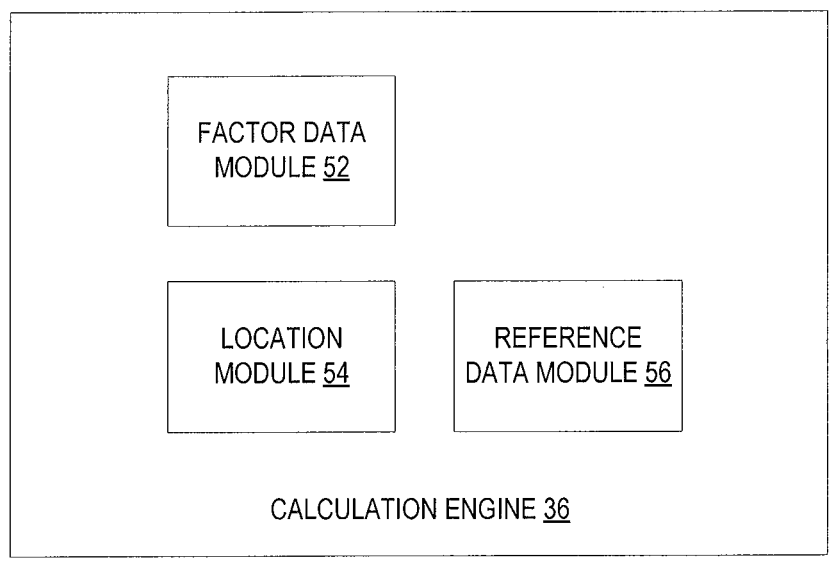
FIG. 2 is a block diagram of a calculation module for calculating and making units and equivalencies conversions of environmental data according to some embodiments.

Referring now to FIG. 2, there is shown a block diagram of a -calculation module 36 according to some embodiments. The calculation engine 36 is operable to compute at least one emission value for the activity defining the environmental data. In accordance with some embodiments, benchmarking module 38 is operable to interact with calculation module 36 in order to benchmark current calculated emission values against historical calculated emissions values for an entity. Benchmarking module 38 is operable to determine a distribution for the historical calculated emissions values for an entity to segment a graphical representation in order to benchmark current calculated emission values for the entity. The distribution may be an empirical distribution, normal distribution, and the like.

Calculation module 36 is implemented using a processor and a memory storing instructions, the instructions being executable to configure the processor to provide a number of functional elements, such as for example, factor data module 52, location module 54, and reference data module 56. These are examples only and different modules may be used to implement calculation module 36 in order to calculate emissions values or other environmental data values. The components of the calculation module 36 are modular and can function independently or together. Calculation module 36 enables asynchronous communication and data exchange between the components.

The location module 54 manages data relating to locations. The emissions generated by an activity or resources consumed by an activity may depend on the location of the activity. For example, the electricity used in Ontario has a significantly lower carbon footprint than electricity used in Alberta because 80% of the electricity provided in Ontario comes from either atomic or hydroelectric sources whereas 80% of the electricity used in Alberta comes from coal-fired generators. As another example, different countries use different protocols (e.g., GHG, Bilan Carbone) to calculate emissions values. The location must be factored in when determining how an emissions value should be calculated in order to comply with a given protocol.

Calculation engine 36 may use the location module 54 to compute emissions values regarding an activity that occurs at a particular location. In response, the location module 54 will compute and return a location hierarchy for the location associated with the activity. The location module 54 may also receive a user identifier along with the request in order to compute a location hierarchy specific to the user. The location module 54 may use location hierarchies as a mechanism to organize geographic locations relative to other geographic locations.

A location hierarchy may include one or more location nodes arranged as a graph or tree relative to other location nodes. A location node may be a parent node (e.g. "world"), a child node (e.g. "third floor"), or both a parent and child node (e.g. "Canada"). The location module 54 is further operable to customize location nodes for a user to reflect the user's specialized view of the world. By creating custom location nodes a user can create arbitrary levels of abstraction specific to their view of how the world is organized. Examples include multi-country regions, sales regions, buildings, offices, and electrical outlets. The location module 54 may receive the user identifier along with the location of the activity in order to compute a customized location hierarchy specific to the user. The location module 54 may compute a location hierarchy using standard location nodes (e.g., cities, states, provinces) applicable to all users and overlay custom location nodes (e.g., 'downtown office') applicable only to specific users. If two users have custom location nodes, the location module 54 may compute one location hierarchy comprised of standard and custom location nodes for one user and a different location hierarchy for the other user. The same standard location nodes will be included in both location hierarchies. The location module 54 will use the graph to compute a location hierarchy specific to the user that is a tree or directed graph for the calculation engine 36. This allows the components to directly traverse up the location hierarchy from a given location node (child node) without encountering multiple paths due to the child node having multiple parent nodes.

The factor data module 52 manages factor data by associating each factor with at least one source, at least one location, a valid start date, and a valid end date. The factor data module 52 may also associate factors with a user, where only a specific user has permission to use the factor.

Factors provide numerical data (factor values) for use by the calculation engine 36 when calculating emission values. A very accurate way to measure emissions would be to monitor them directly as they are emitted. If real time monitoring is not feasible or possible, a factor (i.e., an emission factor) provides a mechanism to estimate the rate at which a pollutant is released into the atmosphere (or captured) as a result of the activity (or standardized activity). An emission factor is therefore measured in units of an emission type per unit of activity (e.g., grams of $CO_2$ per km driven). Other examples include, pounds of $SO_2$ per bushel of Wood Burned, milligrams of Volatile Organic Compounds per hour of Dry Cleaning, and liters of $H_2O$ per Dishwasher Cycle.

Emission factors may depend upon numerous variables including: the location of the activity (e.g., percentage of electricity produced by coal in the United States); the product associated with the activity (e.g., approximate gas mileage for a Toyota Prius); the service associated with the activity (e.g., $CO_2$ emitted per passenger for a flight from Toronto to Chicago); time intervals (e.g., percentage of electricity produced by coal in Toronto in July 2008); the scientific methods used to calculate them; the source category of an emission; the temperature at which the emission occurred; and many others. Emission factors are approximations or averages that reflect constantly changing real world scenarios.

The factor data module 52 can store factor data locally in a database or access data stored remotely in third party databases. The factor data may be derived from protocols (e.g., GHG, IPCC, CDP), industry standards, emission databases, internal calculations, industry associations (e.g., EPA) and user specific databases, for example.

Calculation engine 36 may request from the factor data module 52 emission factors for the standardized activity, where the request includes the location hierarchy and the time interval. In response, the factor data module 52 is operable to determine which factors are valid for the time period of the standardized activity data and the locations defined by the location hierarchy.

As noted above, factors may depend on the location of an activity. The factor data module 52 will attempt to determine the most specific factors using the location hierarchy. For example, the location hierarchy may be Toronto-Ontario-Canada-World. If factors specific to 'Toronto' are not available or valid for the specified time interval, then the factor data module 52 will traverse successively up the location hierarchy to parent nodes of 'Toronto' and attempt to compute factors specific to Ontario, and then to Canada, etc.

If the factor data module 52 determines that there are multiple valid factors available for a given location and time interval, then the factors module 52 ranks the valid factors from most accurate to least accurate to compute a list of ranked valid factors. The factor data module 36 determines which valid factors are the most accurate for the given location hierarchy and time interval.

The reference data module 56 is operable to compute reference data relevant to each standardized activity. The reference data module 56 may access reference data stored locally in a database or remotely in third party databases (e.g., EPA fuel guide database). Reference data may have a specific type. Examples of different types of reference data include: fuel efficiency, fuel type, electricity type, waste type, paper size, car name, etc.

The data provisioning module 50 may tag raw activity data elements as different types of reference data for access by the reference data module 56. For example, the activity may be the use of 2000 kwh of electricity in the Toronto Office over a period of 3 months, where 90% is obtained from the grid and 10% is obtained from green sources. The type of reference data may be 'electricity type' and the specific reference data value for this activity will be '90% grid' and '10% green'. When an emission value is computed for the grid and another emission value is computed for the green sources, the system 10 may use the reference data '90% grid' and '10% green' in order to compute the emission value for the activity as a whole.

The factor data module 52 and the reference data module 56 are interconnected and tightly coupled. A given factor may be independent of reference data or may depend on some type of reference data. For example, an emission factor for compost is independent of reference data and depends only on the location of the activity. However, a factor for fuel consumption depends on the reference data 'fuel type' (e.g., gas, diesel). Accordingly, the factor data module 38 may directly access the reference data module 56 when computing factors relevant to the location hierarchy and time interval.

The calculation engine 36 engages the data provisioning module 50 to compute one or more emission values for each standardized activity using the data for each standardized activity (e.g., the input label, the activity type, time interval, location). The calculation engine 36 may compute an emission value for the activity as a whole using the emission values computed for the standardized activities that make up the activity. In addition, the calculation engine 36 may compute multiple emission values for a given standardized activity.

The calculation engine 36 is operable to use the location module 54 to generate a location hierarchy using the location of the standardized activity. The calculation engine 36 is operable to query the reference data module 56 for relevant reference data and the factor data module 36 for relevant factors using the location hierarchy and the time interval for the standardized activity.

As noted above, factors may only be valid for a specific location, time interval, protocol, etc. The factor data module 52 will return the most specific and accurate valid factors for each standardized activity, and may return a different set of valid factors for one standardized activity than for another standardized activity even though both are related to the same activity. For example, an activity may take place from June 2008 to August 2008 and one factor may be the most accurate but only valid for July 2008. All standardized activities that take place in July will use that factor but the standardized activities that take place in June and August will use another factor.

Dividing an activity into multiple standardized activities allows the most accurate and specific factors to be used to calculate the emission value for that standardized activity, even though the factors may not be valid for the entire time interval of the activity. Increasing the granularity of the standardized activity time intervals and the granularity of the factor data time intervals allows for more accurate emission calculations.

If protocols, factors, or emission equations are added or updated at some point in the time interval for the activity, this will be reflected in the calculations for an individual standardized activity as the activity as a whole is broken down into a standard time measure such as days. Further, historical data (e.g., activity data saved in the activity database) may be used to re-calculate emission values as factors or protocols are updated and created.

The calculation engine 36 determines one or more optimal emission equations given the data related to the standardized activity (e.g., input label, activity type, reference data, factors).

The calculation engine 36 maintains a database of emission equations and associates each emission equation with a valid time period, the source of the equation (e.g., a protocol) and an activity type. Sources for equations include scientific data, protocols, government programs, reports, industry standards, specific customers, etc. For example, typically a protocol, such as GHG, will define a set of equations to use for calculations in order to comply with the protocol. In addition, specific customers may develop their own internal equations for use by that specific customer only. The database of emission equations can be updated with new equations as new science is developed, new protocols are created, or existing protocols are updated. When an existing equation is updated with a new version, the system 10 will implement versioning to keep track of the old equation and all subsequent versions.

Equations may be implemented using a domain specific language, and are generally made up of one of more of the following variables: standardized activity data (e.g., input label, activity type, location, time interval, consumption value); reference data; emission factors; another equation result (e.g., a sub-equation within the equation); and protocol constants (e.g., radiative force of air travel).

The calculation engine 36 determines a set of emission equations that match at least some of the standardized activity data, the computed reference data and the computed factor data. Equations may be valid for a protocol, location, emission type, and time interval. The calculation engine 36 queries a database for valid emission equations that match the standardized activity data, location hierarchy, reference data, and factors.

For example, if there is no valid equation for the specific location of the activity, then the calculation engine 36 will successively traverse up the location hierarchy to the first parent node to determine whether there is a valid equation for that location, etc.

If the set of equations includes multiple emission equations, then the calculation engine 36 ranks or scores the equations with reference to the specific user, standardized activity data, location hierarchy, reference data, and emission factors in order to determine the optimal emission equation for this specific standardized activity. The calculation engine 36 may associate metadata regarding accuracy with each equation in order to rank the emission equations.

Finally, the calculation engine 36 selects an optimal emission equation from the ranked set of emission equations for use in calculating the emission value.

Once the optimal emission equation is determined, the calculation engine 36 computes emission values for the standardized activity by applying the standardized activity data, reference data, and factors to the optimal emission equation. The calculation engine 36 will compute at least one emission value for each standardized activity in order to compute an emission value for the activity as a whole. The emission equation may be associated with a specific protocol, which may dictate which emission factors should be used for the calculation and returned by the factor data module 36. Accordingly, the optimal emission equation may be selected prior to computing which factors to use for the time interval and location.

The calculation engine 36 is further operable to store the at least one emission value in an emission database, or transmit the emission value to the ESB 18 for access by the benchmarking module 38, storage module 40, user interface module 42, the enterprise client 24, the API 20, or the personal client 22.

If emission equations and factors are added or updated, then the calculation engine 36 can re-calculate emission values using historical activity data stored in the activity database 42 using the latest and most accurate equations and factors. For tracking purposes, the calculation engine 36 can associate each computed emission value with the emission equation (and version) and factors used for its calculation.

Figure 3:
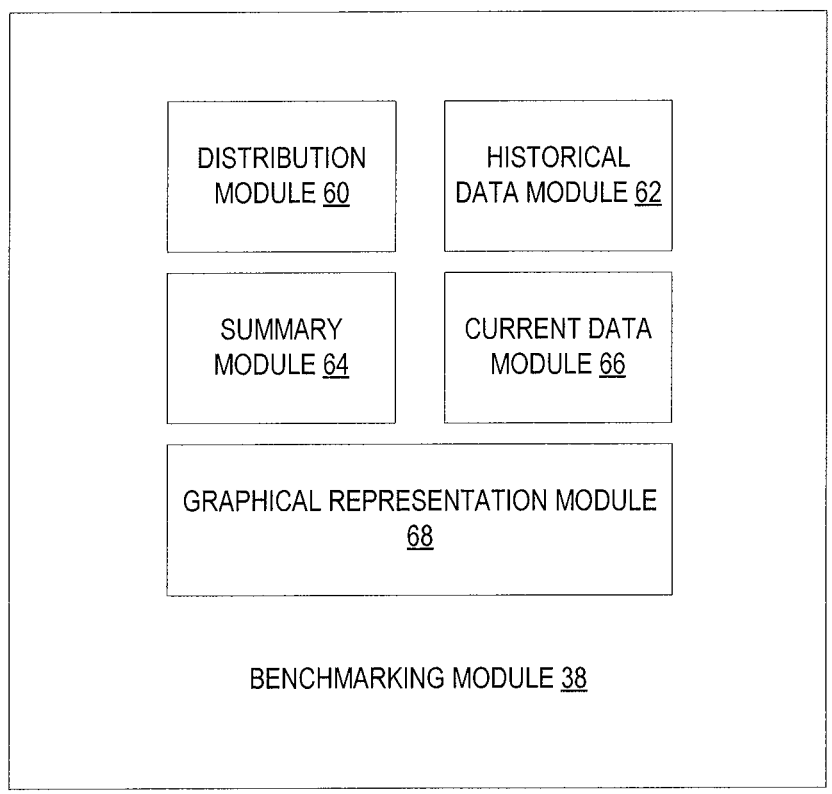
FIG. 3 is a block diagram of a benchmarking module according to some embodiments.
Figure 4:
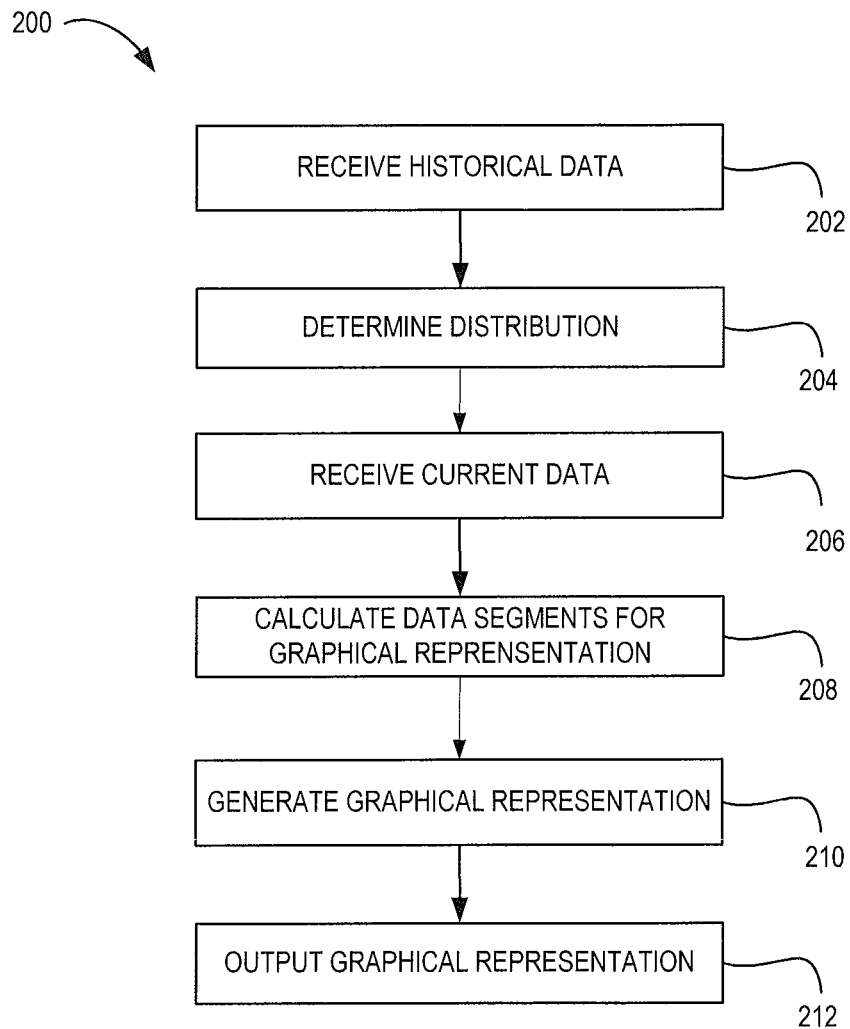
FIG. 4 is a flow chart diagram of a method for benchmarking environmental data according to some embodiments.

Referring now to FIGS. 3 and 4, there is shown a block diagram of a benchmarking module 38 and a flowchart diagram that illustrates the steps 200 taken by benchmarking module 38 to benchmark current environmental data for an entity against historical environmental data for the same entity according to some embodiments. Benchmarking module 38 is implemented using a processor and a memory storing instructions, the instructions being executable to configure the processor to provide a number of functional elements, such as for example, distribution module 60, historical data module 62, summary module 64, current data module 66, and graphical representation module 68. These are examples only and different modules may be used to implement benchmarking module 38 in order to benchmark environmental data for an entity, such as an organization or individual. The components of the benchmarking module 38 are modular and can function independently or together. Benchmarking module 38 enables asynchronous communication and data exchange between the components.

At 202, historical data module 62 is operable to receive or retrieve historical environmental data for an entity, from e.g. storage module 40, input module 34, enterprise client 24, personal client 22. Historical environmental data may relate to resource consumption, emission generation (or reduction), health activities, socially beneficial activities, and the like. Historical environmental data may be associated with a data type (e.g. emission type, fuel type), a time interval, a location of the environmental data, date, unit of measure, data values (e.g. consumption values), and the like.

The historical environmental data may be filtered based on a variety of parameters, such as data type, time interval, date range, and the like. As an example, the consumption values may represent energy consumption (e.g. electricity consumption) and the data type may be energy usage. The historical environmental data relates to a time interval of interest where the current environmental data for the time interval will be benchmarked against the historical environmental data for the same time interval. The historical environmental data includes historical data values (e.g. consumption values) associated with a time interval, over a range of different dates. For example, the historical environmental data may include an historical consumption value for the time interval 9 AM to 10 AM for 90 different days.

The historical environmental data may include historical consumption values, where each of the historical consumption values is associated with a time interval and a different date within the date range of interest for benchmarking. The historical consumption values (or other historical environmental data) may be converted to a standard unit of measure.

The historical environmental data may include activity data, standardized activity data, calculated emission values, and other types of data relating to the environment. For example, the historical environmental data may relate to activities for the entity and calculated emission values for activities, such as historical flying, walking, and driving data for an entity. The flying data may include departure location, destination location, type of the airplane, date, time interval, and the like. The walking data may include number of steps, distance traveled, time interval, date, and the like. The driving data may include fuel type, vehicle type, date, time interval and the like. As another example, the historical environmental data may relate to energy usage, such as electricity usage, and calculated emission values for energy usage. The energy data may include the source of energy (e.g. broken down into different percentages such as 70% grid, 30% green).

As a further example, the historical environmental data may relate to waste generation, and calculated emission values for waste generation. The waste data may include composition amounts such as metals, glass, food, paper, plastics, other. As another example, the historical environmental data may relate to heating home/office with natural gas, and calculated emission values for heating home/office with natural gas. The heating data may include fuel type and amount consumed for time intervals on different dates. As another example, the historical environmental data may relate to paper usage for an office building, and calculated emission values for paper usage for an office building. The paper usage data may include paper type, amount consumed for time intervals on different dates. These are examples only and other historical environmental related data may be received by system 10 for benchmarking. The benchmarking module 38 is operable to interact with input module 34 and storage module 40 to receive historical environmental data.

Historical data module 62 is operable to convert raw activity data into one or more standardized activities with particular time intervals and dates, and distribute the consumption values among the standardized activities. The standardized activity data is an example of environmental data that may be benchmarked by system 10. The historical environmental data includes historical consumption values, where each is associated with a time interval of interest and a different date. The standardized activities may also be associated with a time interval. System 10 is operable to parse received historical environmental data into separate time intervals for benchmarking. In some embodiments, the historical and current environmental data is associated with a data type and a location of the environmental data. For example, the data type may be electricity usage and the location may be an office building or geographic location.

At 204, distribution module 60 is operable to determine a distribution for the historical environmental data in order to segment a graphical representation used for benchmarking, e.g. by positioning the current environmental data within one of the segments. Distribution module 60 is operable to determine the empirical distribution for the historical environmental data. Distribution module 60 is operable to approximate the distribution for the historical environmental data for the entity using a normal distribution. Distribution module 60 is operable to use other types of distributions for the historical environmental data.

Distribution module 60 is operable to use a distribution model that assumes that the environmental data follows a normal distribution. Other distribution models and may also be selected. Distribution module 60 is operable to estimate a mean and a standard deviation for historical environmental data for the entity in order to calculate boundaries to determine segments for the graphical representation. For example, the mean and the standard deviation may be calculated using consumption values for the historical environmental data. Distribution module 60 is operable to calculate the normal distribution of the historical environmental data using the estimated mean and the estimated standard deviation.

Distribution module 60 is operable to use the normal distribution to calculate data segments for use in a graphical representation benchmarking current environmental data against historical environmental data for the entity. Benchmarking module 38 may approximate the distribution on an assumption that environmental related data follows normal distribution. This assumption enables use of the 68-95-99.7 rule for normal distributions, where this rule implies that 68%, 95% and 99.7% of the observations would fall within 2, 4, 6 standard deviations of the mean, respectively. That is, about 68% of the values lie within +/−1 standard deviation of the mean, about 95% of the values lie within +/−2 standard deviations of the mean, and 99.7% (almost all) of the values lie within +/−3 standard deviations of the mean.

Figure 5:
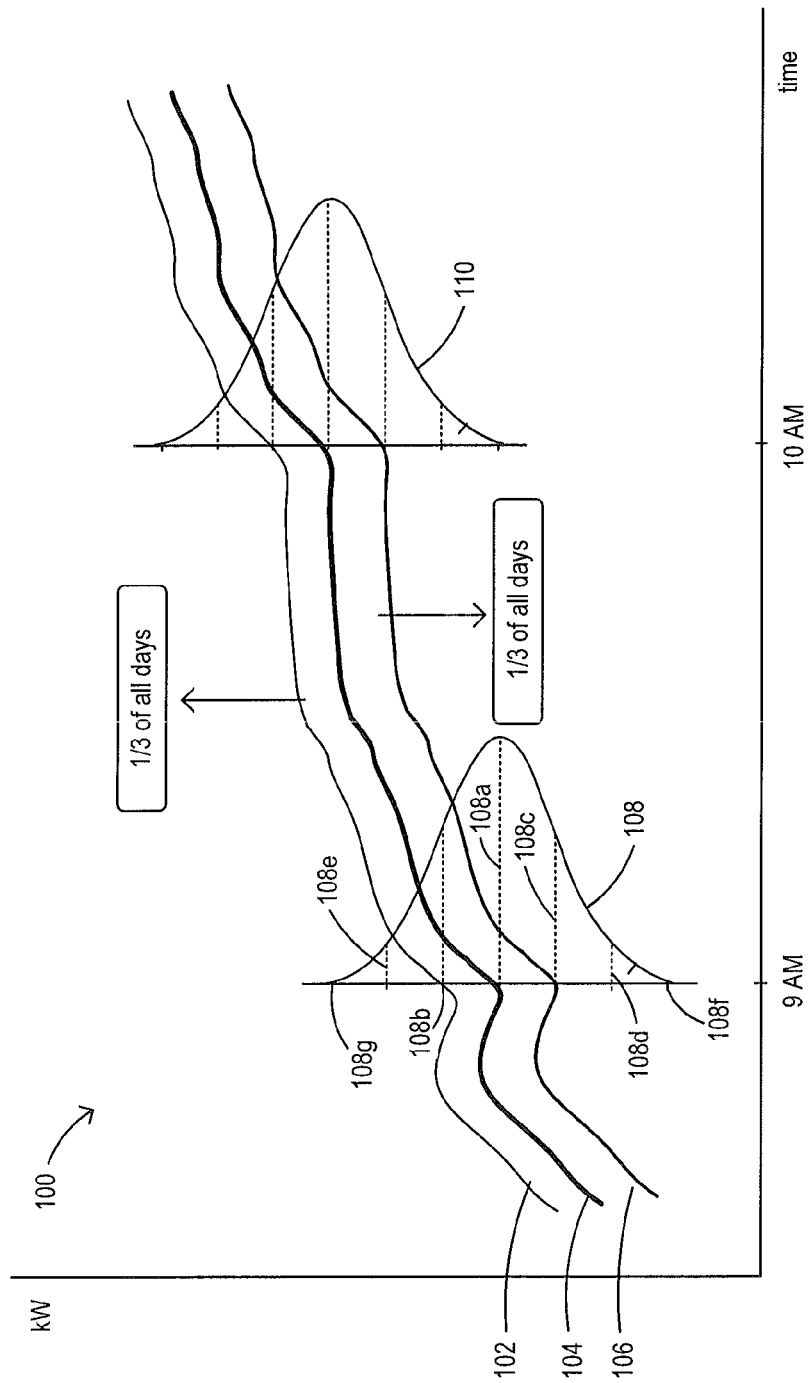
FIG. 5 is a schematic diagram of a graphical representation of distributions for environmental data.

Referring now to FIG. 5, there is shown a graphical representation of a chart 100 illustrating estimated means for historical environmental data representing electricity consumption values for different dates over the time range 9 AM to 10 AM. In particular, the chart 100 plots the estimated mean of historical electricity usage values in kilowatts (kW) for different dates against time, and in particular a time range of 9 AM to 10 AM. The chart 100 illustrates a normal distribution graph 108 for the time interval 9 AM and another normal distribution graph 110 for the time interval 10 AM. The normal distribution graphs 108, 110 are segmented based on the 68-95-99.7 rule for normal distributions. For example, a normal distribution graph 108 for the historical electricity usage values at 9 AM shows a line 108*a* representing the estimated mean, a line 108*b* representing −1 standard deviation of the mean, a line 108*c* representing +1 standard deviation of the mean, a line 108*d* representing −2 standard deviations of the mean, a line 108*e* representing +2 standard deviations of the mean, a line 108*g* representing −3 standard deviations of the mean, and a line 108*f* representing +3 standard deviations of the mean. The chart 100 illustrates three graph lines 102, 104, 106, where one graph line 104 represents the estimated mean for the historical electricity consumption values for different dates over the time range 9 AM to 10 AM, another graph line 102 represents −1 standard deviation of the estimated mean for the historical electricity consumption values for different dates over the time range 9 AM to 10 AM, and the third graph line 106 represents +1 standard deviation of the estimated mean for the historical electricity consumption values for different dates over the time range 9 AM to 10 AM. As shown, the graph lines 102, 104, 106 intersect the estimate mean and +/−1 standard deviation of the mean on the normal distribution graphs 108, 110 shown for 9 AM and 10 AM. The chart 100 is an example graphical representation and other variations may be used. Based on the 68-95-99.7 rule for normal distributions, about a third of all historical electricity usage values for all dates observed will be between two graph lines 102, 104 and another third of all historical electricity usage values for all dates observed will be between the other two graph lines 104, 106.

At 206, current data module 66 is operable to receive current environmental data for the entity, where the current environmental data may include a current consumption value for the time interval, for example.

The current environmental data may relate to activity data, resource consumption, emission generation (or reduction), health activities, socially beneficial activities, standardized activity data, calculated emissions values, or other emission related data. The current consumption value may be converted to a standard unit of measure. The current environmental data may be instantaneous real-time data or may be data currently of interest to a user or entity.

Current environmental data values may relate to multiple time intervals, and the current data module 66 is operable to parse the current environmental values into individual time intervals each to be benchmarked against historical environmental values for corresponding time intervals. The current data module 66 is operable to interact with distribution module 60 and graphical representation module 68 to determine which data segment the current environmental data should be represented within, and the position of the current environmental data within the particular data segment.

At 208, system 10 calculates data segments (or boundaries along the scale representing the distribution of environmental data) for use in generating a graphical representation to benchmark the current environmental data against the historical environmental data. Graphical representation module 68 is operable to generate the graphical representation benchmarking the current environmental data against the historical environmental data. The graphical representation may comprise data segments and represents the current environmental data at a position within one of the data segments. In some embodiments, the position representing the current environmental data indicates how the current environmental data compares to the estimated mean or average calculated based on the historical environmental data.

Graphical representation module 68 is operable to calculate data segments for a graphical representation of the benchmarking by determining a distribution for the historical environmental data. For example, the graphical representation may include three data segments, one segment for an average, one segment for lower than average, and another segment for higher than average. The three data segments may be calculated by determining tercile data points for the historical environmental data. The three data segments may also be determined based on a normal distribution of the historical environmental data, where the normal distribution of the historical environmental data is calculated using the estimated mean and the estimated standard deviation. Other distributions may also be used to segment the graphical representation, and other segmentations techniques may also be used to determine the segments. Any number of segments may be used and three is an example only. The segments may be determined by calculating boundaries for the scale representing the distribution, where the boundaries may be a factor of the standard deviation and mean.

Graphical representation module 68 is operable to determine other quantiles to divide the historical environmental data into a different number of segments. The quantiles are the data values marking the boundaries between consecutive groups or subsets of the historical environmental data for the entity. The quantiles may be used for dividing ordered historical environmental data into essentially equal or near-equal sized data subsets.

At 210, graphical representation module 68 is operable to generate one or more graphical representations benchmarking the current environmental data against the historical environmental data. The graphical representation includes the data segments and represents the current environmental data at a position within one of the segments. The position representing the current environmental data may indicate how the current environmental data compares to the estimated mean or average range in order to benchmark against historical environmental data. Benchmarking module 38 may return to steps 206 and 208 to receive real time updates for current environmental values and update the graphical representation based on the real time updates. That is, the graphical representation may be updated to provide a real-time benchmarking of current environmental data against historical environmental data.

At 212, benchmarking module 38 is operable to display, print, transmit, or otherwise output the graphical representation for display as part of a graphical user interface on a device 12 via personal client 22 or enterprise client 24.

By way of illustrative example, benchmarking module 38 is operable to benchmark electricity usage in a building for different time intervals by comparing it to historical usage. Historical data module 62 is operable to receive kilowatt (kW) (e.g. watt-hour) values for a specific time interval over 7 business days. Distribution module 60 is operable to determine a distribution for the electricity usage, such as an empirical distribution or an approximate distribution based on a normal distribution model. For example, for real-time benchmarking, benchmarking module 38 is operable to estimate the mean and standard deviation for these observations. The mean and standard deviation may be used to plot the comparative distribution on a graphical representation for a specific time interval and a summary graphical representation for multiple time intervals.

Figure 6:
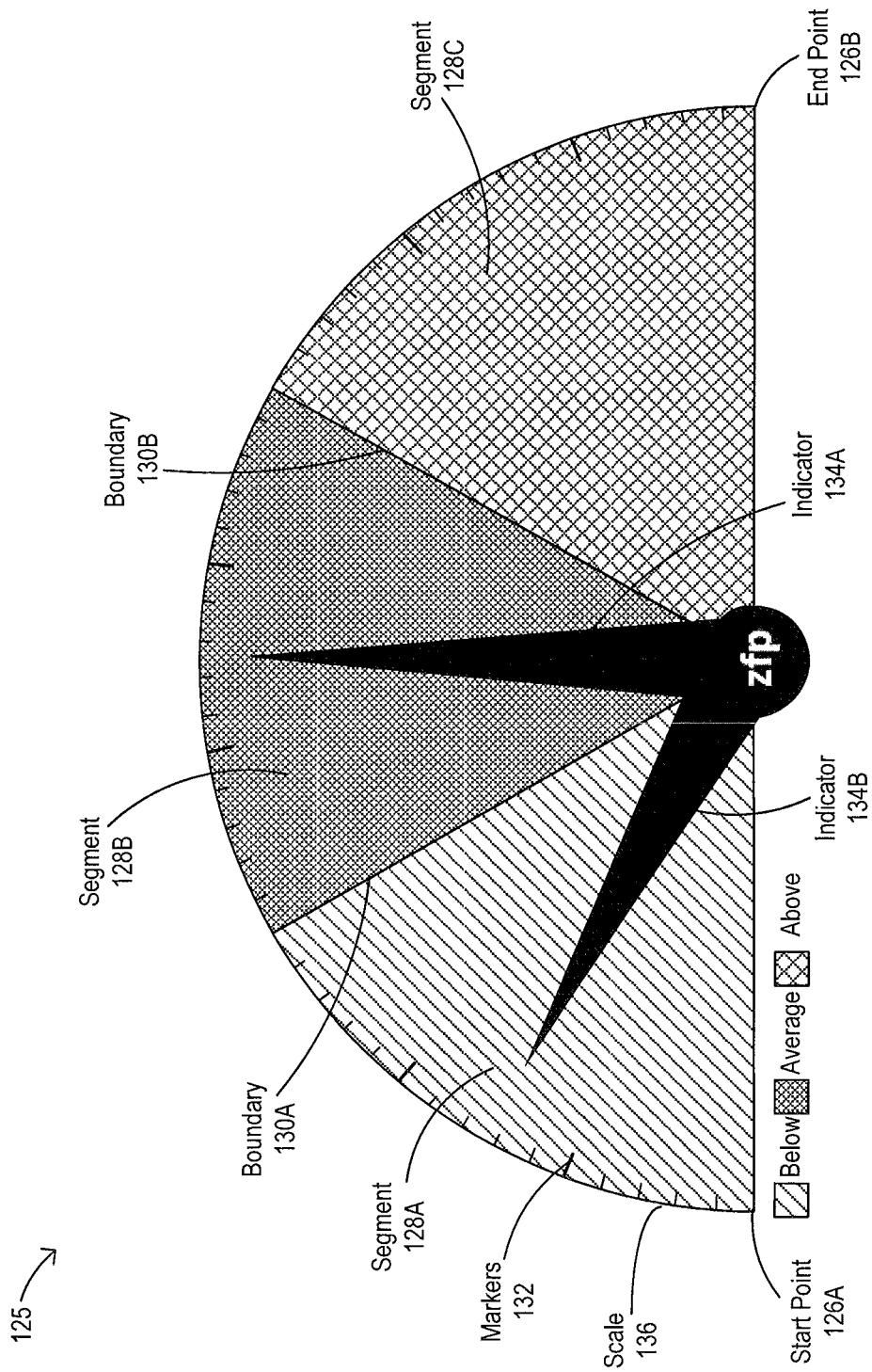
FIG. 6 is a schematic diagram of an interface for benchmarking environmental data according to some embodiments.
Figure 7:
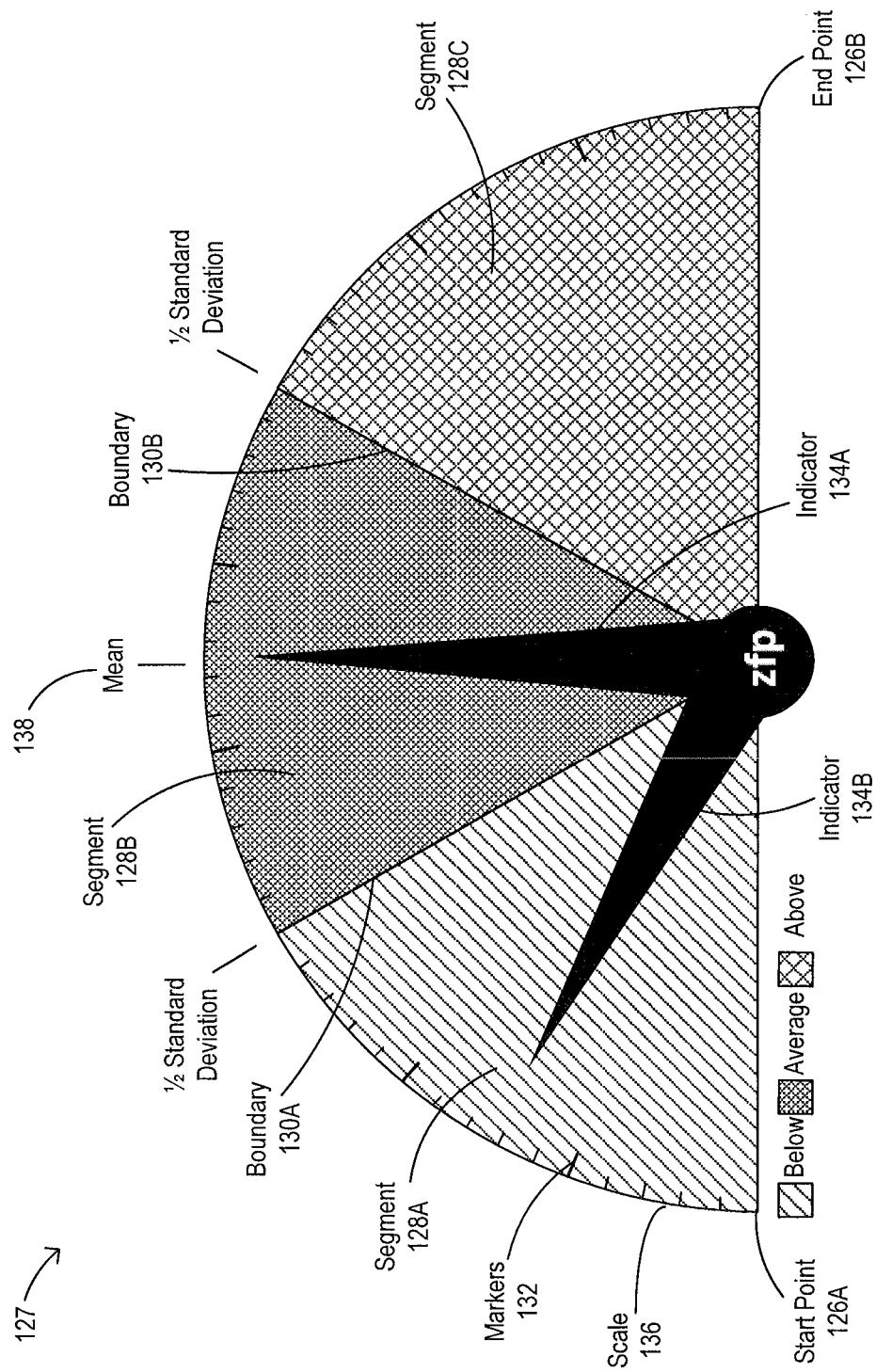
FIG. 7 is a schematic diagram of another interface for benchmarking environmental data according to some embodiments.

Referring now to FIGS. 6 and 7, there are shown graphical representations in the form of a gauge 125 for benchmarking current environmental data against historical environmental data for an entity. The graphical representation in the form of a gauge 125 may be displayed using personal or enterprise client 22, 24 or otherwise output. For example, gauge may represent electricity usage by an organization. In one embodiment, gauge 125 has the form of a semi-circle, mimicking the layout of a speedometer. Starting point 126A is located at the bottom left edge of gauge 125, representing the lowest range of data in the dataset. End point 126B is located at the bottom right edge of gauge 125, representing the highest range of data in the dataset. Scale 136 is located along the perimeter of the semicircle and represents an axis along which data points are plotted representing deviations from the estimated mean. Scale 136 also indicates data points between the lowest and highest deviations from the mean. Markers 132 for specific data points (representing specific deviations from the mean) may be provided on scale 136. While gauge 125 appears to be a two dimensional form the data points are effectively in a tabular, one dimensional form, where all data points reflect deviations from the estimated mean calculated based on the historical emissions values.

Segments 128 may be defined for the dataset. The segments 128 can represent one or more segments, dividing the dataset in halves, thirds, quarters, fifths, and the like, with each segment 128 being approximately the same size in the visual representation of the gauge 125. For the example gauge 125 shown in FIGS. 6 and 7 the dataset has been divided into three segments 128A, 128B, 128C of approximately equal size in terms of visual area in gauge 125. As such, boundary 130A shows a boundary between two data segments 128A, 128B and boundary 130B shows a boundary between two data segments 128B, 128C.

In calculating the segments 128 and boundaries 130, graphical representation module 68 is operable to use the distribution (e.g. empirical distribution, normal distribution) for the historical environmental data points. For example, the segments 128A, 128B, 128C of FIG. 6 may be based on the tercile points of the ordered historical environmental data to divide the historical environmental data into three subsets of generally equal size. The scale 136 may not be the same for each of the segments 128A, 128B, 128C as the range of data points in each of the segments 128A, 128B, 128C may not be equal depending on the data set. However, even if the range for each of the segments 128A, 128B, 128C is not equal the segments may still be shown to be of approximately equal size.

Figure 9:
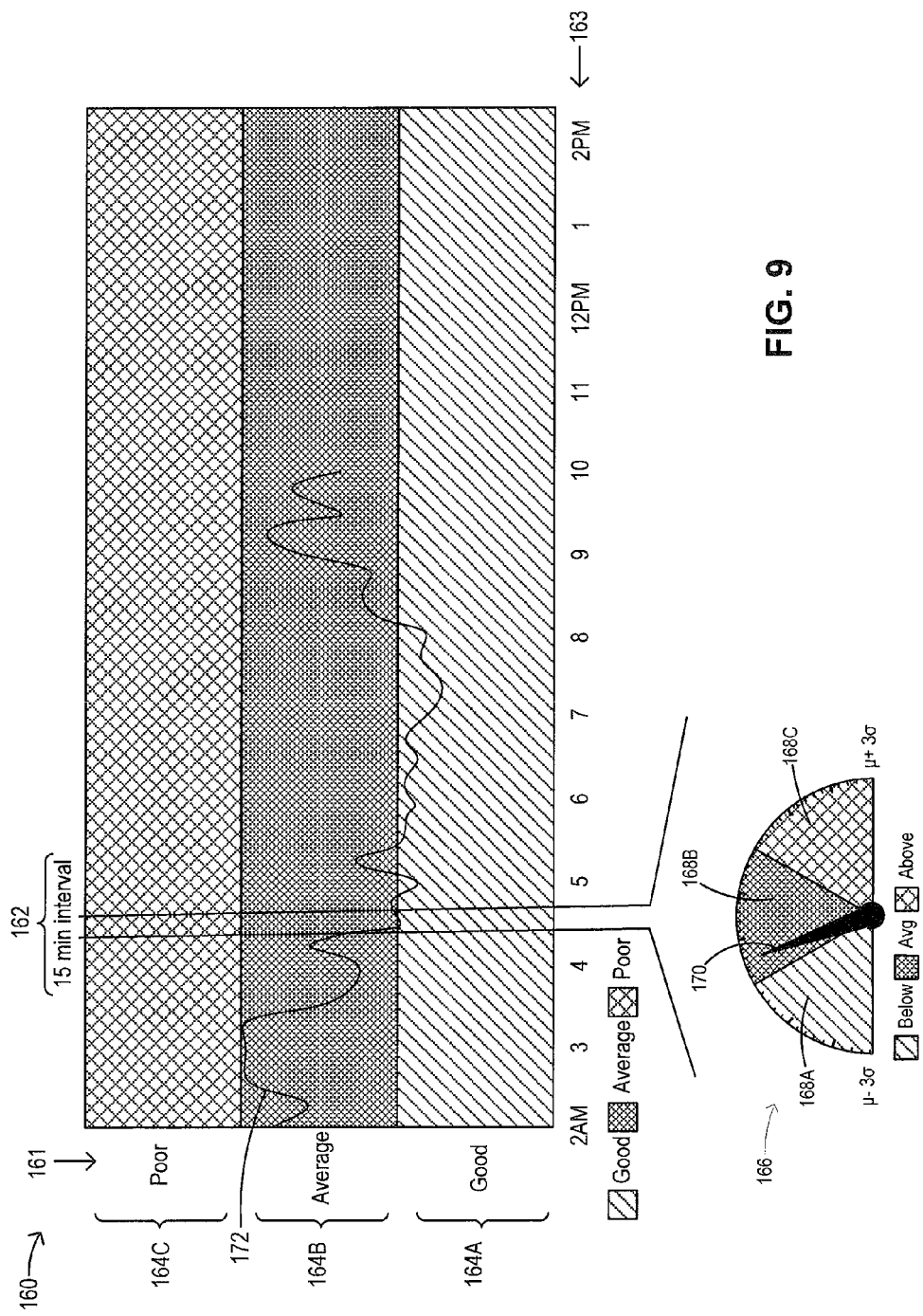
FIG. 9 is a schematic diagram of a user interface with summary graphical representation for benchmarking environmental data according to some embodiments.

As another example, the segments 128A, 128B, 128C of FIG. 7 may leverage the 68-95-99.7 rule for normal distributions. System 10 may have approximately equal sized segments 128 for all time intervals to enable all time intervals to be represented within a summary chart, as shown in FIG. 9. For such an embodiment, the segments 128A, 128B, 12C represent deviations from the estimated mean. Starting point 126A (FIG. 7) is located at the bottom left edge of gauge 125, representing data values furthest from the estimated mean calculated based on the historical environmental data. End point 126B (FIG. 7) is located at the bottom right edge of gauge 125, representing data values furthest from the estimated mean calculated based on the historical environmental data.

For example, a data segment 128B may represent average consumption (e.g. data points in the first subset divided by a tercile, data points proximate to the estimated mean), a data segment 128A may represent lower than average consumption (e.g. data points in the second subset divided by a tercile, data points well below the estimated mean), and a data segment 128C may represent a higher than average consumption (e.g. data points in the third subset divided by a tercile, data points well above the estimated mean). Accordingly, gauge 125 may be used to compare current consumption values to the typical or average values for historical data (e.g. estimated mean) for the entity.

For ease of identifying segments 128 different patterns, shading, colors, or other visual cues may be used to distinguish between segments 128. For example, a green-yellow-red color scheme may be used for the segments 128 to provide a go-caution-stop visual analogy that a user can understand and interpret from gauge 125. The green segment 128A may represent ideal or preferred values (i.e. least consumption, most efficient), the yellow segment 128B may represent acceptable values (i.e. average), and the red segment 128C may represent non-ideal, worst, least preferred values (e.g. most consumption, least efficient).

Further, each segment 128 may have approximately the same number of markers 132 representing different values in relation to the average or mean. However, the markers may represent a different range of values for each segment 128 depending on the mechanism used to determine the segments. Other distributions can be provided where there is a segment indicating a preferred range and on either side of the preferred range, adjacent segments sequentially less preferred. There may be multiple preferred ranges.

The visual presentations can be augmented to show data in two or three dimensions. A two dimensional representation may introduce another parameter on another axis (e.g. time, location). For example, additional slices of gauge 125 may be shown for different time intervals or locations and stacked showing different snapshots of different times. A three dimensional representation may introduce two additional parameters on two additional axes (e.g. time and location).

Returning to the illustrative and non-limiting one dimensional representation by gauge 125, scale 136 can be linear, non-linear, linear in sections and non-linear in other sections, so that the scale values along scale 136 differ in different sections (e.g. each segment can represent a different range of values). Values for such sections can be based in part on the number of segments defined. Markers 132 show values along scale 136 in major and minor increments. In this representation, scale 136 may be linearly scaled within each segment 128. Gauge 125 shows a graphical representation where each segment 128 is approximately of equal size, where each segment spans approximately the same height along the axis of scale 136. However, as noted, each segment 128 may not show an equal range of data points along scale 136: each segment 128 covers a range of datapoints that may not be linear to a range of datapoints in another segment 128.

Referring to FIG. 7 in example embodiments using a normal distribution, while segments 128 are approximately of the same size, a segment 128A shows datapoints between $\mu-3\sigma$ and $\mu-\frac{1}{2}\sigma$, a segment 128B shows datapoints between $\mu-\frac{1}{2}\sigma$ and $\mu+\frac{1}{2}\sigma$, and another segment 128C shows datapoints between $\mu+\frac{1}{2}\sigma$ and $\mu+3\sigma$, where $\mu$ is the mean and $\sigma$ is the standard deviation.

Markers 132 along the scale 136 may be presented in different colours, fonts, or emphasis to indicated different segments 128.

Referring back to FIG. 6, segments 128 and scale 136 of gauge 125 provide an indication of an overall distribution of datapoints within a dataset. Gauge 125 also provides an indication of the location of a particular datapoint within the distribution, through indicator 134. As scale 136 represents a range of datapoints for historical environmental data, indicator 134 provides a visual marker noting a current environmental data value along scale 136 relative to the historical environmental data. In gauge 125, indicator 134 is presented as a needle within the speedometer paradigm of gauge 125. This is a non-limiting example and other forms of indicators 134 may be used (such as a marker along scale 136). Indicator 134 points to a value along scale 136 relative to the historical environmental data for an entity in order to benchmark current environmental data against the historical environmental data. A second indicator may also be used to represent a target value, ideal value, best value, and the like.

Gauge 125 is presented as a speedometer but other forms may also be used such as a circle, square, rectangle, chart, table, oval, bullseye, pie chart, and the like. General characteristics for gauge 125 are a scale 136 divided into segments 128 and ranging from a start value 126A to an end value 126B. The progression may or may not be linear. The position of the indicator 134A, 134B can be updated to reflect changing current environmental data. The current environmental data may be received in near real-time and the position of the indicator 134 may correspondingly update in near real-time. Gauge 125 may provide a snapshot of current environmental data benchmarked against historical environmental data for an entity for a specific time interval.

In accordance with some embodiments, the gauge 125 may relate to a particular time interval and may represent historical environmental data for the time interval. The values for the scale 136 may be determined based on the distribution of the historical environmental data.

For example, the distribution may be an empirical distribution and the values on the scale 136 may represent historical observed data points. As another example, the distribution may be a normal distribution determined based on the estimated mean, standard deviation and normal distribution for a time interval. The gauge 125 (FIG. 7) may illustrate the estimated mean 138 as a specific marker that is in the middle of the scale 136. The scale 136 may be divided into segments 128 roughly based on the normal distribution of the historical environmental data and may focus on values within +/−1 standard deviation of the mean. Based on the 68-95-99.7 rule for normal distributions roughly 68% of the environmental data will be within +/−1 standard deviation from the mean. Environmental data outside +/−1 standard deviation of the mean will be represented at startpoint 126A and endpoint 126B of the scale 136 as they are much less likely to occur but will nevertheless be visually represented to the user as an extreme point on the scale 136. This enables the gauge 125 to effectively display a spread of deviations of the mean will focusing in on more likely values.

As an example, one boundary 130A may represent −½ standard deviation from the mean and another boundary 130A may represent +½ standard deviation from the mean. The first data segment 128B may represent average consumption as values between −½ standard deviation and +½ standard deviation of the estimated mean. The second data segment 128A may represent lower than average consumption as values more than −½ standard deviation of the estimated mean. The third data segment 128C may represent a higher than average consumption as values more than +½ standard deviation of the estimated mean. An indicator 134 may move from various positions along scale 136 to represent current environmental data and how it compares to the estimated mean. That is, indicator 134 may indicate whether current environmental data for a particular time interval is within the first data segment 128B (average consumption or values between −½ standard deviation and +½ standard deviation of the estimated mean), the second data segment 128A (lower than average consumption or values more than −½ standard deviation of the estimated mean) or the third data segment 128C may represent a higher than average consumption as values more than +½ standard deviation of the estimated mean.

The gauge 125 may be divided into the same segments 128 in the same manner (e.g. as shown in a non-limiting example in FIG. 7 to be between −½ standard deviation and +½ standard deviation of the estimated mean, more than −½ standard deviation of the estimated mean, and more than +½ standard deviation of the estimated mean) for different time intervals so that when gauge 125 represents a new time interval the indicator 134 only needs to move to a new position to show how the current environmental data for the new time interval compares to the mean for that time interval. Note that the specific values for the estimated mean and standard deviation may change between time intervals but the position representing the mean and the +/−½ standard deviation will be the same along the scale between time intervals. This enables the same visual representation for gauge 125 and segments 128 to be used for multiple time intervals.

Further, by calculating the segments 128 using the mean, standard deviation, and normal distribution then more commonly occurring environmental data values (e.g. those proximate the mean and +/−½ standard deviation) will be spread out along scale 136 (e.g. represented by more markers 132 along the scale 136) and the outliers or less common environmental data values (e.g. those far from the mean and +/−½ standard deviation) will be compressed at the extreme ends (e.g. startpoint 126A, endpoint 126B) of the scale 136. This recognizes that the indicator 134 will more often hover around the mean 138 then on the extreme ends of scale (e.g. startpoint 126A, endpoint 126B). This may provide a more meaningful visualization to the user.

Figure 8:
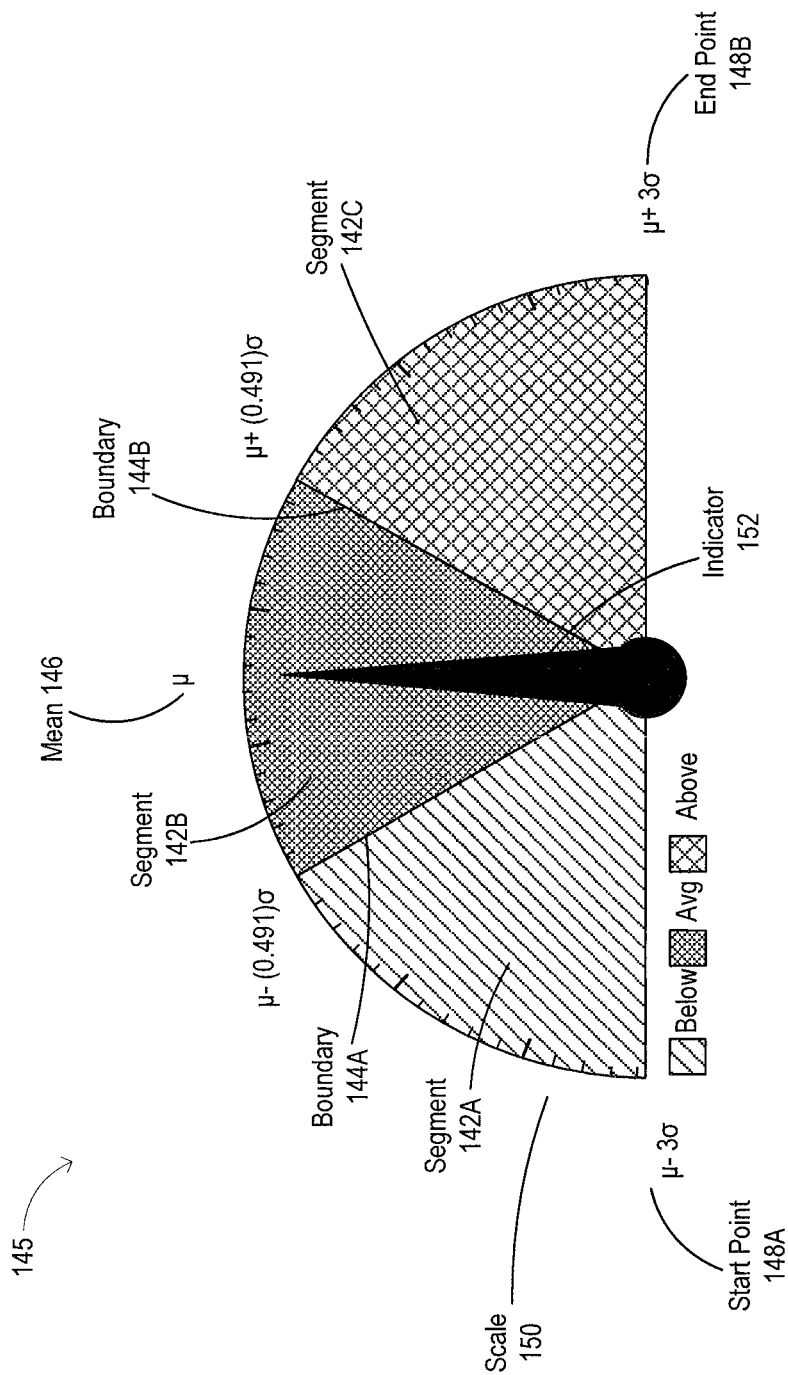
FIG. 8 is a schematic diagram of a further user interface with a graphical representation for benchmarking environmental data according to some embodiments.

Referring now to FIG. 8, there is shown another graphical representation of a gauge 145 used to benchmark current environmental data against historical environmental data for an entity based on the normal distribution approximating the distribution for the environmental data. In accordance with some embodiments, graphical representation module 68 is operable to calculate three data segments 142A, 142B, 142C such that the one data segment 142A represents environmental data within the range $\mu-3\sigma<X(t')<\mu-(0.491)\sigma$, another data segment 142B represents environmental data within the range $\mu-(0.491)\sigma<X(t')<\mu+(0.491)\sigma$, and a further data segment 142C represents environmental data within the range $\mu+3\sigma>X(t')>\mu+(0.491)\sigma$, where $X(t')$ is an environmental data point, $\mu$ is the estimated mean for historical environmental data, and $\sigma$ is the estimated standard deviation for historical environmental data. A boundary 144A may represent environmental data values that are $\mu-(0.491)\sigma$ and another boundary 144B may represent environmental data values that are $\mu+(0.491)\sigma$.

In accordance with the 68-95-99.7 rule for normal distributions, the startpoint 148A may represent values that are $\mu-3\sigma$ and the endpoint may represent values that are $\mu+3\sigma$. Accordingly, the scale 150 may represent environmental values as the compare to the estimated mean 146 ranging between the startpoint 148A $\mu-3\sigma$ and the endpoint 148B $\mu+3\sigma$. The position of the indicator 152 represents the current environmental data for the time interval of interest in order to benchmark the current environmental data against the historical environmental data for the entity. The indicator 152 indicates how the current environmental data compares to the mean or average value calculated based on the historical environmental data.

In accordance with some embodiments, a first data segment 142A represents a lower than average consumption, a second data segment 142B represents an average consumption, and a third data segment 142C represents a higher than average consumption. As noted above, calculating the segments 142 based on the estimated mean and standard deviations enables an effective visual display of how current environmental data benchmarks or compares to historical environmental data as the more common values are spread out over the scale 150 and the outliers or less common values are compacted at the extreme ends of scale 150, recognizing that the indicator 152 will be more often hovering around the mean, $\mu-(0.491)\sigma$ and $u+(0.491)\sigma$ and less likely to be on the extreme ends. Otherwise the indicator 152 may mostly be positioned within a small area of the gauge 145 and it may be difficult for a user to notice fluctuations around the mean, $\mu-(0.491)\sigma$ and $\mu+(0.491)\sigma$ as the may be represented in a smaller portion of the scale 150.

In this example, the gauge 145 positions the indicator 152 to show actual consumption and the color behind the indicator 152 refers to the segment 142 and the location in the segment 142. Each segment 142 may be assigned a color to represent the low, medium, and high usage segments 142. For example, a color green may represent low consumption, a yellow may represent average consumption, and a red may represent high consumption. The segment 142 map directly to the areas in the corresponding normal distribution at the chosen time interval.

Referring back to FIGS. 3 and 4, in accordance with some embodiments, summary module 64 is operable to repeat 202 to 208 for each of a plurality of time intervals in order to generate a summary graphical representation covering multiple time intervals. Summary module 64 is operable to generate a summary graphical representation benchmarking current environmental data against historical environmental data over multiple time intervals, such as multiple time intervals covering a business day. The summary graphical representation may include overall data segments for all of the time intervals. The summary graphical representation may represent, for each of the time intervals, the position representing the current environmental data of the respective time interval within one of the overall data segments. By normalizing the data segments for each time interval using a distribution for the historical environmental data, summary module 64 is able to scale the data segments over all time intervals.

The summary graphical representation may be gauge 145 (FIG. 8) where current environmental data for an entity may be benchmarked against historical environmental data for the same entity over multiple time intervals by showing a changing position of indicator 152 for each individual time interval. The segments 142A, 142B, 142C may have the same size and position within the summary graphical representation for each individual time interval. The segments 142A, 142B, 142C may cover the same range or a different range along scale 150 for each individual time interval. As noted, in some example embodiments, the segments 142 may be calculated using the same methodology for each time interval so that the position of the boundaries 144 and the size of the segments 142 may be static across time intervals even though the underlying values for the mean and the standard deviation may change across time intervals. Essentially, by analogy, a summary graphical representation may be a stack of gauges 145 where the indicator 152 on each gauge 145 will change depending on the current environmental value for the particular time interval.

Referring now to FIG. 9, there is shown an example summary graphical representation as a line chart 160 benchmarking current environmental data against historical environmental data across multiple time intervals. In this particular line chart 160 one axis 161 represents how current environmental data compares to the estimated mean or average range for historical environmental data. The other axis 163 represents multiple time intervals, and in this example, 15 minute time intervals from 2 AM to 2 PM. The chart 160 is divided into three segments 164, where one segment 164A represents a lower than average consumption/generation, a second data segment 164B represents an average consumption/generation, and a third data segment 164C represents a higher than average consumption/generation. These segments 164 may correspond to segments 128, 142, of gauge 125, 145 shown in FIGS. 6, 7 and 8. The segments 164 may be calculated using distributions in the same manner such that the chart 160 represents a summary view of all gauges 125, 145 for multiple time intervals.

The trend line 172 indicates how the current environmental data for an entity compares to the mean of the historical environmental data for the entity for its particular time interval, across all the time intervals shown. As noted, since the segments may be calculated using the same methodology across all time intervals this facilitates generation of a summary line chart 160 as the same segments 164 and position of the current environmental data relative to segments 164 are shown. Essentially, the methodology normalizes each time interval to facilitate generation of a summary chart 160 across all time intervals.

As shown by the trend line 172 the current environmental data may change compared to the mean of the historical environmental data across the time intervals. For a particular time interval 162, a gauge 166 may be used to represent current environmental data benchmarked against the mean of the historical environmental data, where the position of the indicator 170 corresponds to the value of the line graph 172 for the time interval. The segments 168A, 168B, 168C of the gauge 166 for the time interval 162 may correspond to the segments 164A, 164B, 164C of the summary chart 160, as both segments 164, 168 may be calculated using the same methodology based on the distribution (e.g. empirical, normal) of the historical environmental data.

The line chart 60 is an additional example graphical representation of the statistical benchmarking method. For this non-limiting illustrative example, the trend line 172 represents kW values over 8 hours compared to the historical distribution. Each data interval 162 is scaled relatively to show relative usage by calculating the segments for each time interval using the same methodology. Essentially, the line chart 160 displays a summary of the benchmarking analysis for 8 hours of time intervals. Each interval 162 is calculated similar to the calculations used to generate the gauge 166. The line chart 160 could be seen as multiple gauges 166 over a period of time.

Energy consumption is an example of environmental data, and other types of environmental data may be benchmarked by system, such as emission generation, activity data, and the like. In some example embodiments, the environmental data is assumed to have a normal distribution in order to approximate the distribution for the environmental data.

Figure 10:
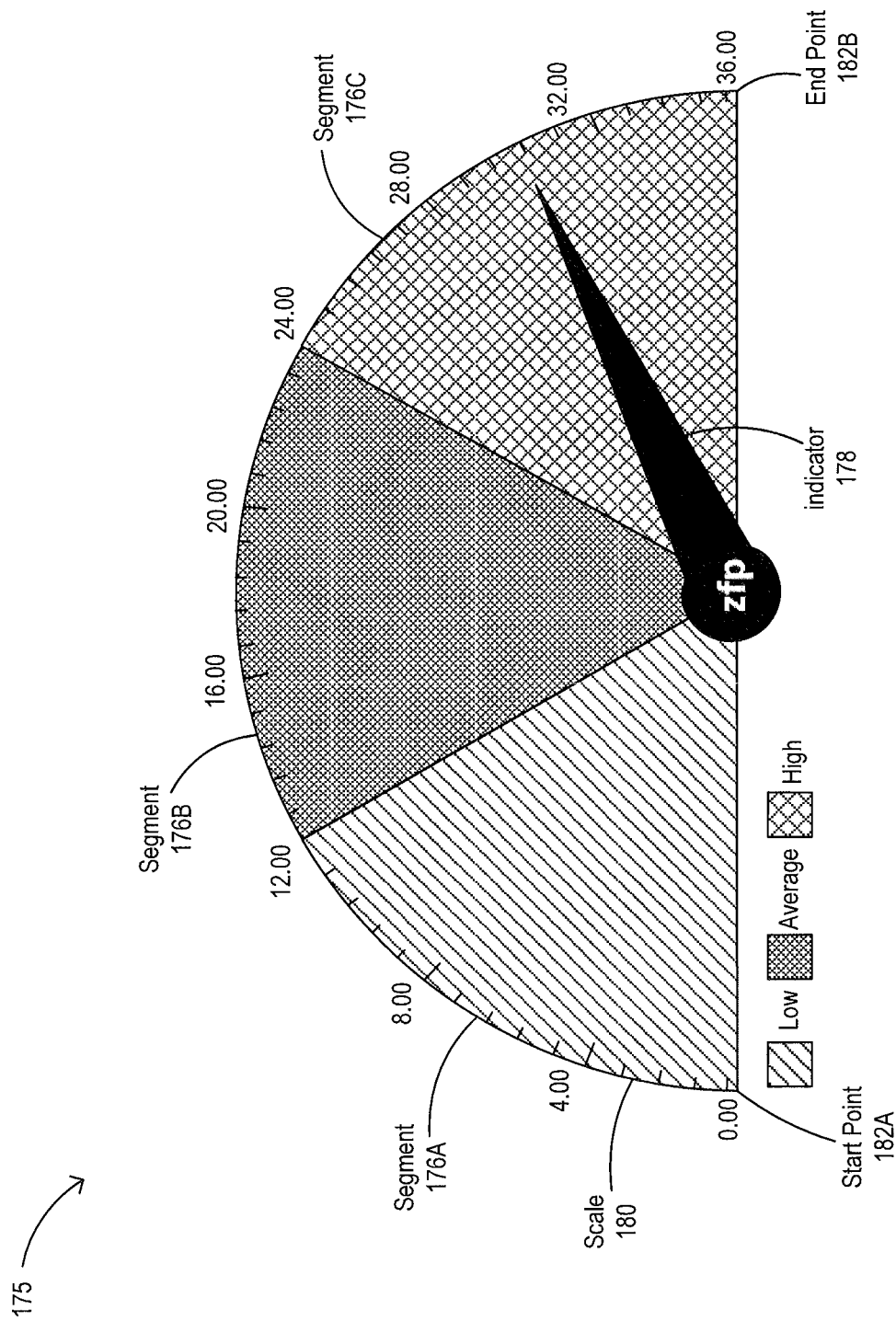
FIG. 10 is a schematic diagram of another user interface with a graphical representation for benchmarking environmental data according to some embodiments.

For example, referring now to FIG. 10 there is shown a gauge 175 benchmarking a current amount of time spent walking (or other fitness activity) by a user against historical amounts of time spent walking for the user or other users, for a particular time interval such as from 9 AM to 6 PM. Walking may represent a health activity or a reduction in emissions for a user as they are not driving, etc. The gauge 175 may be divided into three segments 176 where one segment 176A may represent lower than average amount of walking, another segment 176B may represent an average amount of walking, and a further segment 176C may represent a higher than average amount of walking. The historical environmental data may be specific to a user, a group or subset of users, or all users tracked by system 10. The segments 176 may be calculated using the same methodology described herein based the distribution of the environmental data. In some example embodiments, an empirical distribution may be calculated and used to determine the segments. In other example embodiments, a normal distribution may be used to approximate the distribution for the environmental data and system 10 may estimate a mean and standard deviation for the historical environmental data. As an illustrative example, the scale 180 may range from a startpoint 182A of 0 to an endpoint 182B of 36 based on historical environmental data for walking activities. The position of the indicator may reflect current environmental data and indicate how it compares to the mean or average range of historical environmental data.

System 10 is operable to generate a graphical representation in the form of a gauge 125 (e.g. FIGS. 6, 7, 8). The sizes and locations of the scale, segments and its boundaries at a given time need to be defined. As shown, there may be a boundary for each segment or portion of the graphical representation. As noted herein, the values of the ranges for the scale and boundaries may be established via distribution analysis, based on historic environmental data for the entity. The boundaries may in turn be used to determine and define the segments. In one embodiment, one or both of the boundaries may be determined using such a distribution analysis of environmental data, such as consumption data, emission values, activity data, and the like.

For example, the segments may represent approximate "thirds" for a range of consumption levels, where the one segment represents the middle third of the distribution, one segment represents the low third of the distribution and one segment represents the upper third of the distribution. In some example embodiments, system 10 is operable to determine terciles to segment the historical environmental data into thirds. In other example embodiments, system 10 is operable to determine the ranges for the segments may be based on the mean or median of the distribution. In other example embodiments, the environmental data can be assumed to follow a normal distribution in order to approximate the distribution of the environmental data. The center of the distribution can be considered to be the middle of the middle segment. The center of the distribution can be the mean or median of the consumption values, or may be the data points between two terciles for ordered environmental data.

In some example embodiments, boundaries may be set at values that are a factor of a standard deviation. In some example embodiments, boundaries may also be set based on terciles for ordered environmental data, or other mechanism to divide the environmental data into segments. For example, a boundary in one embodiment may be set to be ⅙ of a standard deviation lower the center, where ⅙ is half of ⅓ of the scale. Another boundary can be set at values that are ⅙ of a standard deviation above the center. Other factors, equations and offsets may be used and other distributions may be used (e.g. log-normal, Pareto, Poisson, exponential, empirical, normal and others). For example, with a normal distribution, at a particular point in time, the consumption data can be shown as per gauge 125 (FIG. 7) where each segment 128 is approximately the same size. It will be appreciated that other factors for boundary values can be applied (e.g. ½, ⅓, ¼ of a standard deviation, quartiles of the environmental data, etc.).

Different methodologies may be used to determine specific boundaries for segments for environmental data. In one embodiment, a distribution can be generated or determined from environmental data for an entity for a previous period of time. For a business entity, the period of time may be measured in business days, e.g. consumption data for the previous twenty (20) business days. Any range of historical environmental data may be used (e.g. from 0 day to 3 years or more).

One illustrative example embodiment may examinee current energy consumption for an entity at continuous points in time and compares the value to historical consumption values for the entity. In some embodiments, system 10 estimates the mean and standard deviation at a particular time point for the data based a modeling assumption that the distribution of data values follows a normal distribution. Other distributions may also be used. A boundary for the medium and higher segment may be set by one or more parameters. In one embodiment one parameter is used and is set to approximately 0.5 (in another example embodiment it is set at 0.49) of a standard deviation above the mean. Using the same parameter, a boundary for the medium and lower segment is set at approximately 0.5 of a standard deviation below the mean. With these boundaries, approximately one third of the consumption values at a point in time over the historical period are located in the higher segment (i.e. at or above the boundary between the middle and higher segment); approximately one third of the consumption values at that time are located in the middle segment; and approximately one third of the consumption values are located in the lower segment. Other values for portions of a standard deviation can be used, or other parameters may also be used such as quartiles of ordered environmental data to divide the data into groups. That is, different values can be used for the upper and lower segments and the examples provided herein are illustrative and non-limiting.

At a given point in time, gauge 125 (FIG. 6) may show its segments as evenly spaced segments with the current datapoint centered in the middle of the middle segment. The boundaries between the segments may be determined using different mechanisms such as based on quartiles of ordered environmental data, portions of the standard deviation (0.49 or ½ as noted in the examples), and the like. In some example embodiments, the boundaries of the segments in gauge 125 may map to the boundaries of bands in chart 160 (FIG. 9) at the relevant time interval, for example. In another embodiment, visual presentation of the scale of each of the segments can be varied.

In some distributions, the lower and/or middle segments may have a concentrated number of values therein, thereby leading to a skewing of the weighting of the distributions. As such, if the bands or segments were displayed in a linear manner, the lower and/or middle segments would occupy a very small portion of gauge 125. In such situations, the y-axis may be adjusted to widen the scale where there is a higher concentration of values and/or shrink the scale where there is a lower concentration. This adjustment of boundaries can be applied to any graphical representation of data described herein (for example to gauge 125 and chart 160).

Figure 11:
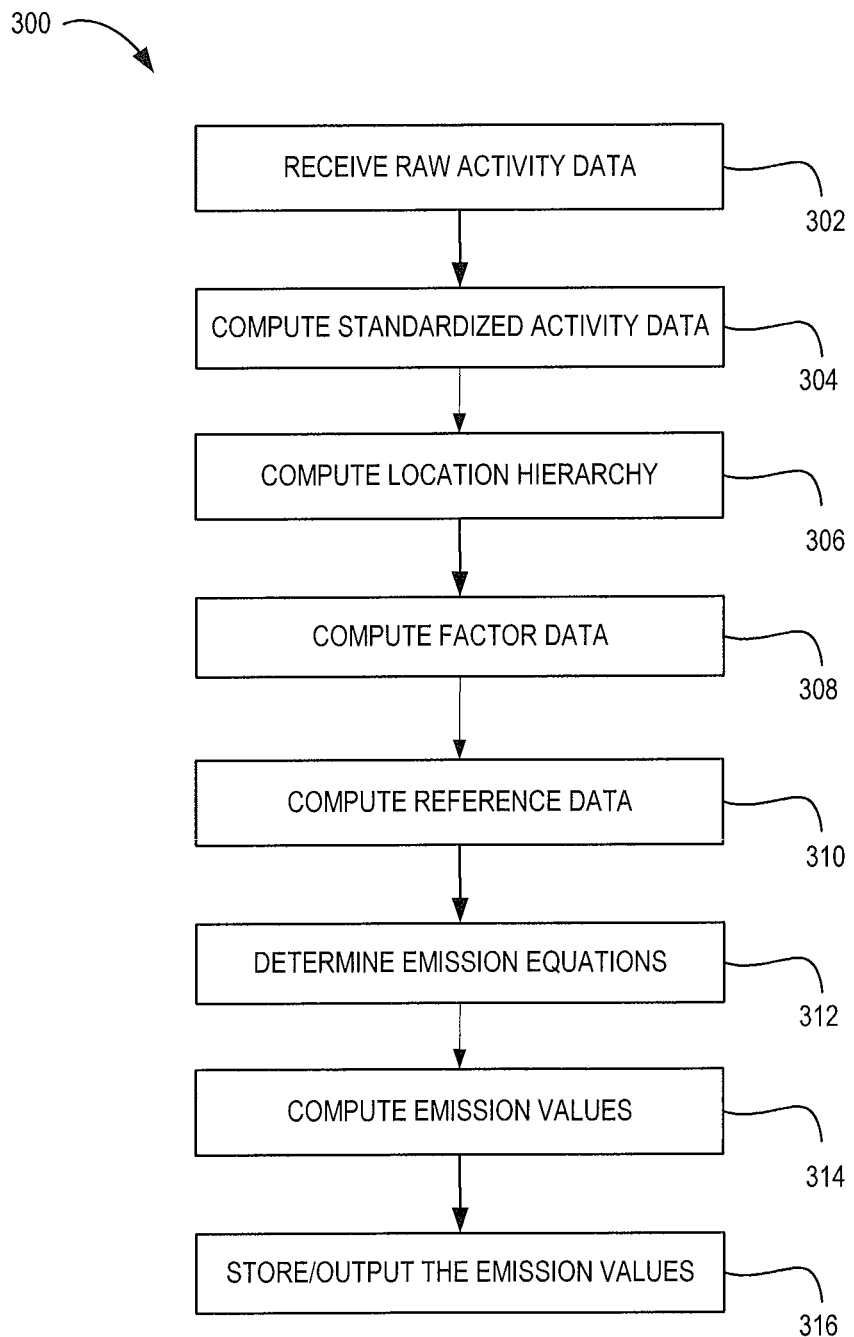
FIG. 11 is a flow chart diagram of a method for calculating and making units and equivalencies conversions of environmental data such as emissions values according to some embodiments.

Referring now to FIG. 11, there is shown a flowchart diagram that illustrates the basic steps 300 taken by system 10 to compute emission values for an activity. The emission values and activity data are examples of environmental data that may be benchmarked. Benchmarking module 38 is operable to benchmark current emission values against historical emission values for an entity using the methodology described herein based on an estimated mean and standard deviation for historical environmental data. System 10 is operable to use a distribution model for emission values. For example, system 10 may use an empirical distribution for historical emission values. As another example, system 10 may assume that emission values follow a normal distribution in order to approximate the distribution for the emission values. System 10 is operable to generate a graphical representation for benchmarking emission values with segmentation based on a distribution of the historical emission values. In some example, the segmentation may be based on an estimated mean and standard deviation for historical emission values.

The process begins at 302, where the input module 34 receives raw activity data to define a record for an activity. The raw activity data may include: an activity type; a time interval; a location; a unit of measure; and a consumption value. System 10 stores the raw activity data in a storage module 40. This raw activity data is an example of environmental data that may be benchmarked by system 10.

For example, the activity may be a three-day SUV rental from Dec. 30, 2007 through Jan. 1, 2008, and the raw activity data may include:
Activity type: driving
Vehicle type: Ford Escape (SUV)
Fuel efficiency: 10 L/100 km
Total distance: 750 km
Time interval: 3 days (Dec. 30, 2007, Dec. 31, 2007, Jan. 1, 2008)
Fuel type: Gasoline engine
Unit: km
Fuel consumption: 75 L
Location: Toronto At 304, the calculation engine 36 converts the raw activity data into one or more standardized activities, and stores the standardized activity data in the activity database. The standardized activity data is an example of environmental data that may be benchmarked by system 10.

For this example, the calculation engine 36 converts the raw activity data into three standardized activities, each with a 1 day time interval. The calculation engine 36 divides the total distance evenly (250 km/day) and distributes the fuel consumption evenly (25 L/day) over the three standardized activities. The calculation engine 36 determines that the input label for each standardized activity is 'distance driven' based on the activity type.

At 306, calculation engine 36 computes a location hierarchy corresponding to the location of the activity. Referring to the example, the location hierarchy may be Toronto-Ontario-Canada-World.

At 308, the calculation engine 36 computes factor data corresponding to the location hierarchy and the time intervals for each standardized activity. As noted above, in some instances the optimal emission equation will be selected (see 312) before the calculation engine 36 computes the factor data because the emission equation may be associated with a specific protocol which may dictate which factors to use. The calculation engine 36 associates each factor with a source (e.g., protocol, third party database), location(s), a valid start date and a valid end date.

The calculation engine 36 determines which factors are valid for the location hierarchy and the time interval of the standardized activity. If the calculation engine 36 determines that multiple valid factors are available for the standardized activity then the calculation engine 36 ranks the valid factors from the most accurate to the least accurate to compute a list of ranked valid factors each standardized activity. The accuracy of each factor may be associated with each factor as metadata and used by the calculation engine 36 to rank the factors.

The calculation engine 36 is operable to use the list of to calculate the emission values for each standardized activity.

Referring to the example, the calculation engine 36 may determine that three emission factors are associated with SUVs: (1) a factor sourced from the GHG protocol valid for Ontario for January-December 2007; (2) a factor sourced from the Ontario Government valid for January-December 2008; (3) a factor sourced from an independent one-day study by a Toronto car company valid for Dec. 31, 2007. The factor data module 36 will rank each of these factors based on accuracy and compute the following ranked factor list: (3), (1), (2). The emission value for the standardized activity for Dec. 30, 2007 will be computed using factor (1) as it is the only valid factor available. The standardized activity for Dec. 31, 2007 will use factor (1) as it is more accurate than the other valid factor (2). The emission value for the standardized activity for Jan. 1, 2008 will be computed using factor (3) as it is the only valid factor available.

At 310, the calculation engine 36 computes reference data relevant to the standardized activities. As noted above, raw activity data may be stored as reference data. For example, 'vehicle type' (SUV), 'name' (Ford Escape), 'fuel efficiency' (averages 10 L/100 km) and 'fuel type' (gasoline engine) may be stored as reference data and retrieved by the reference data module 38 for use in the emission value calculation. If only some raw activity data is provided, such as only the name of the SUV (Ford Escape), then the calculation engine 36 may lookup reference data associated with the provided raw activity data, such as the fuel efficiency for a Ford Escape, in a database of fuel efficiencies that may be maintained by government or automobile industry association (e.g., EPA database of car fuel efficiencies).

At 312, calculation engine 36 determines at least one optimal emission equation using at least some of the standardized activity data, the reference data and the factor data.

The calculation engine 36 is operable to store emission equations in the emission database and associate each emission equation with a valid time interval, a protocol and an activity type. The calculation engine 36 searches the emission database to determine a set of emission equations that match at least some of the standardized activity data, the computed reference data and the computed factor data. The calculation engine 36 ranks each emission equation in the set of emission equations with respect to the accuracy of each emission equation given the standardized activity data, the computed reference data and the computed factor data. Finally, the calculation engine 36 selects an optimal emission equation from the ranked set of emission equations for use in calculating the emission value.

Referring to our example, the calculation engine 36 computes and ranks a set of equations for computing the emission value (e.g., CO2 emissions) for gasoline consumed for each standardized activity. The ranked set of equations may include the United Nations protocol equation and GHG protocol equation, where the UN protocol equation is more accurate but only valid from Jan. 1, 2008.

For example, the optimal emission equation may be: distance_driven*car_fuel_efficiency*emission_factor(car_fuel_type, location, date) where distance_driven is the input label, car_fuel_efficiency is reference data; emission_factor (car_fuel_type, location, date) is factor data and reference data.

At 314, the calculation engine 36 computes at least one emission value for the activity using the at least one optimal emission equation. The calculation engine 36 may compute multiple emission values in order to compute a final emission value for the activity. For example, the calculation engine 36 may compute an emission value for each of the standardized activities, and then aggregate all the emission values to compute a final emission value for the entire activity. The computed emission values are examples of environmental data that may be benchmarked by system 10.

For the above example, for the first and seconds day of the journey, the calculation engine 36 calculates the emission value (e.g., CO2 emissions) using the GHG Protocol equation. For the third day of the journey, the emission equation changes within the time interval of the activity when the United Nations Protocol becomes valid. The emission values calculated for the first and second day using the GHG protocol equation are recorded and the new UN Protocol equation is used to calculate the emission value for the third day of the journey. Accordingly, the calculation engine 36 may calculate a value for each standardized activity using the most accurate and valid equation for that standardized activity, instead of using the same equation to calculate the emission value for the activity as a whole. This allows the calculation engine 36 to use the most accurate emission equation for part of the calculation even though the emission equation is only valid for a portion of the time interval of the whole activity (i.e., Dec. 30, 2007 to Jan. 1, 2008). The calculation engine 36 calculates the total emissions for the journey as the sum of the emission values (e.g., CO2 emitted) for each of the three days (standardized activities) that comprised the activity.

At 316, the system 10 stores the at least one emission value in storage module 40 which may be implemented using a data storage device. The system 10 may also transmit the emission values. Other components such as the enterprise client 24 or the API 20 can access the computed emission value(s) (e.g. environmental data) through the ESB 18.

Another example activity may be providing 2000 kWh of electricity to a Toronto office from Jan. 1, 2007 to Mar. 3, 2007, where 90% of the electricity came from the grid and 10% came from green sources. Generally, the steps will be as described above, subject to modifications described below.

The input module 34 receives the following raw activity data to define the record for the activity:
Activity type: electricity
Time interval: Jan. 1, 2007 to Mar. 3, 2007
Consumption value: 2000 kWh
Reference data: 90% grid; 10% green
Location: Toronto office The calculation engine 36 breaks the raw activity data into standardized activities of a standard time measure (one for each day) and converts to standard units. The emission calculation engine 36 determines two input labels: green_electricity_consumed and grid_electricity_consumed. Associating two input labels with each standardized activity provides an indication to the calculation engine 36 that two emission values will be calculated for each standardized activity.

The calculation engine 36 compute the factor and reference data for each standardized activity given the location hierarchy and time interval. To avoid repetitive lookups, the emission calculation engine 36 may store the computed data in a cache for use in determining the two emission values for each standardized activity (green and grid electricity). The cached data may also be re-used to compute the emission values for all of the standardized activities, as some factor and reference data may be valid for more than one standardized activity.

The calculation engine 36 will determine optimal emission equations and compute two emission values for each standardized activity, one emission value for green_electricity_consumed and another emission value for grid_electricity_consumed. In order to determine a total emission value for each standardized activity, the calculation engine 36 will apply the reference data 10% green and 90% grid and combine the calculated emission values.

This example illustrates that raw activity data may be composed of nested raw activity data elements (green and grid) which results in multiple emission values being computed for each standardized activity (green_electricity_consumed and grid_electricity_consumed).

As another example, the activity may be the waste generated by the Toronto office from Feb. 1 to 28, 2009. The input module 34 receives the raw activity data from a bill issued by the supplier Waste Management Inc., which breaks 1000 KG of waste into the following types of waste:

Metals—8%
Glass—12%
Food scraps—6%
Paper—16%
Cardboard—10%
Plastics—40%
Other—8%

If a bill issued by a supplier does not provide a break down of waste types and only provides the total amount of waste generated, then the data provisioning module 32 may access industry averages or customer averages in order to estimate a break down.

The calculation engine 36 stores reference data for each type of waste (e.g., metals—8%) for later recall. The data provisioning module 50 also determines that the activity type is composed of 7 reference data types (e.g., metals, glass). The emission calculation engine 36 converts the raw activity data into standardized activities and determines that the input label is 'waste_consumed' based on the activity type. The emission calculation engine 36 determines that the optimal emission equation is: waste_consumed*emission_factor (waste_type)

The calculation engine 36 calculates 7 emission values for each standardized activity, one for each type of waste and recalls the reference data relating to the type of waste (e.g., metals—8%) in order to calculate a final emission value for each standardized activity.

Another example activity similar to waste is recycling. The raw activity data and the reference data is similarly broken down into the types of material recycled (e.g., metal, glass, paper, cardboard, plastic, etc.) and the input label is 'recycling_consumed'.

As another example, the activity may be consuming 200 KG of compost in California in June 2008. The calculation engine 36 will determine that the input label is 'compost_consumed'. For this example, no reference data may be required since the calculation engine 36 may maintain only one emission factor for all things compostable. The calculation engine 36 compute a negative emission value for this activity type.

As a further example, the activity may be flying from Toronto (YYZ) to London (LHR) on Aug. 31, 2009. The calculation engine 36 will convert the raw activity data into one standardized activity, since the system 10 may use the default time interval of one day for all flights regardless if the flight spans multiple days. For the activity type 'flying', the calculation engine 36 pre-processes the raw activity data to determine the flight distance. The reference data module 38 is operable to maintain a database of airport information (e.g., list of airports, IATA code, longitude, latitude) to lookup data for the departure location and destination location. The calculation engine 36 may calculate the flight distance using an iterative approach such as the Vincenty algorithm and then returns the calculated flight distance to the emission calculation engine 36. The calculation engine 36 may provide the calculation engine 36 with multiple emission factors for the flight, depending on the altitude reached during the flight, the applicable protocol, the type of the airplane, etc.

As another example, the activity may be heating a home in Vancouver from Mar. 1 to 31, 2009, using 1000 m$^3$ of natural gas. The input module 34 may receive a bill from one or more suppliers. The calculation engine 36 may create a record for each supplier, or if a record for the supplier already exists then it may recall previously stored information regarding the supplier. In this example, the home is heated using only natural gas, however, if multiple gas or fuels types are used then the calculation engine 36 can create standardized activities for each gas or fuel type as in the electricity example. Alternatively, the different fuel types could form sub-types of a single standardized activity as in the waste example. For this example, the reference data includes fuel_type and the input label is fuel_consumed. In this example, the amount of fuel used was provided as the fuel dimension volume (e.g., 1000 m$^3$), however, the fuel may also be provided in another fuel dimension such as energy (e.g., 10,000 BTU).

As a further example, the activity may be using 500 sheets of 8.5×11 office paper from Jan. 1 to 31, 2008 at the Montreal office. The reference data would be paper_type (office paper) and paper_size (8.5×11) and the input label would be 'paper_consumed'. The amount of paper used may be expressed in sheet or other units such as reams. The calculation engine 36 may use the following optimal emission equation, factor data and reference data: paper_consumed*paper_size.area*paper_type*emission_factor(paper_type)

The above described activities are examples only and the system 10 may compute an emission value for many other activities such as dry cleaning, washing a car, watering the lawn, etc.

The components of the system 10 may implement the functionality described herein and organize the data used, generated, and updated by system 10 by defining multiple data classes and tables.

System 10 is operable to compute emission values for an organization over a period of time and benchmarking module 38 is operable to benchmark computed emission values for the organization against other computed emission values for the same organization. This enables organization to compare its emission values to identify problem areas and reduce its emission generation.

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing implementation of the various embodiments described herein.

The invention claimed is:

1. A method for generating and updating a graphical user interface for continuous real-time or near real-time benchmarking of environmental data for an entity, wherein the method is implemented by a processor and a storage device storing instructions, the instructions being executable to configure the processor to perform operations comprising:

determining an approximate normal distribution for historical environmental data for the entity by estimating a mean and a standard deviation, wherein the historical environmental data comprise a plurality of historical data values, wherein each of the plurality of historical data values is associated with a time interval for a historical date;

generating, using the processor, a graphical representation of data segments, the data segments being approximately equal in size when displayed as part of a graphical user interface, wherein the data segments are generated based on the approximate normal distribution of the historical environmental data, the mean and the standard deviation, wherein the data segments represent a scale of environment values as they compare to the estimated mean, each data segment providing boundaries along the scale of environmental values and representing a different range of environmental values, wherein a first data segment represents an average consumption with a first range of data values along the scale, a second data segment represents a less than average consumption with a second range of data values along the scale, and a third data segment represents a greater than average consumption with a third range of data values along the scale, the first range of data values, the second range of data values and the third range of data values being different even though the data segments are approximately equal in size when displayed as part of the graphical user interface such that more common data values are spread out along the scale and less common data values are compacted along the scale;

collecting real-time or near real-time environmental data for the entity to continuously receive a real-time data value associated with the time interval for a real-time date;

generating, using the processor, the graphical user interface for display on a device, wherein the graphical user display comprises a graphical representation benchmarking the real-time or near real-time environmental data against the historical environmental data, wherein the graphical representation illustrates the data segments as approximately equal in size and represents the real-time or near real-time environmental data as a graphical element indicator at a position on the scale within one of the data segments to represent how the real-time data value compares to the estimated mean for the distribution of the historical environmental data in order to benchmark the real-time or near real-time environmental data against the historical environmental data;

continuously collecting additional real-time or near real-time environmental data for the entity to receive real-time updates as additional real-time data values associated with the time interval for the real-time date; and continuously updating the graphical representation based on the additional real-time or near real-time environmental data to move the graphical element indicator to different positions along the scale for the data segments to indicate the how the additional real-time data values associated with the time interval compare to the estimated mean in order to provide a continuously real-time or near real-time benchmark against the historical environmental data.

2. The method of claim 1, wherein the historical and real-time or near real-time environmental data relate to resource consumption by the entity and wherein the plurality of historical data values and the real-time data value comprises consumption values.

3. The method of claim 1, wherein the historical and real-time or near real-time environmental data relate to emission generation by the entity and wherein the plurality of historical data values and the real-time data value comprises emission activity data.

4. The method of claim 1, wherein the historical and real-time or near real-time environmental data is associated with a data type and a location of the environmental data.

5. The method of claim 1, wherein the historical and real-time or near real-time environmental data is associated with a data type and a location of the environmental data.

6. The method of claim 1, wherein the first data segment represents environmental data within the approximate range $X(t') < \mu - (0.491)\sigma$, the second data segment represents environmental data within the approximate range $\mu - (0.491)\sigma < X(t') < \mu + (0.491)\sigma$, and the third data segment represents environmental data within the approximate range $X(t') > \mu + (0.491)\sigma$, where $X(t')$ is an environmental data point, $\mu$ is the estimated mean, and $\sigma$ is the estimated standard deviation.

7. The method of claim 1, wherein determining the distribution for the historical environmental data for the entity comprises determining an empirical distribution for the historical environmental data.

8. A method for generating and updating a graphical user interface for continuous real-time or near real-time benchmarking environmental data for an entity, wherein the method is implemented by a processor and a storage device storing instructions, the instructions being executable to configure the processor to perform operations comprising:

a) for each of a plurality of time intervals, determining an approximate normal distribution for historical environmental data for the entity by estimating a mean and a standard deviation, wherein the historical environmental data comprises a plurality of historical data values, wherein each of the plurality of historical data values is associated with the respective time interval for a historical date;

collecting real-time or near real-time environmental data for the entity, wherein the real-time or near real-time environmental data comprises a real-time data value for the respective time interval; and generating, using the processor, a graphical representation of time interval specific data segments for the respective time interval, the data segments being approximately equal in size when displayed as part of a graphical user interface, wherein the time interval specific segments are generated based on the approximate normal distribution of the historical environmental data, the mean and the standard deviation, wherein the data segments represent a scale of environment values as they compare to the estimated mean, each data segment providing boundaries along the scale of environmental values and representing a different range of environmental values, wherein a first data segment represents an average consumption with a first range of data values along the scale, a second data segment represents a less than average consumption with a second range of data values along the scale, and a third data segment represents a greater than average consumption with a third range of data values along the scale, the first range of data values, the second range of data values and the third range of data values being different even though the data segments are approximately equal in size when displayed as part of the graphical user interface such that more common data values are spread out along the scale and less common data values are compacted along the scale;

collecting real-time or near real-time environmental data for the entity to continuously receive a real-time data value associated with the time interval for a real-time date;

determining a position representing the real-time or near real-time environmental data within one of the time interval specific data segments for benchmarking the real-time or near real-time environmental data against the historical environmental data;

continuously collecting additional real-time or near real-time environmental data for the entity to receive real-time updates as additional real-time data values associated with the time interval for the real-time date;

b) generating, using the processor, the graphical user interface for display on a device, wherein the graphical user display comprises a graphical representation benchmarking the real-time or near real-time environmental data for all of the plurality of time intervals against the historical environmental data for all of the plurality of time intervals, wherein the graphical representation illustrates overall data segments as being approximately equal in size and representing the scale of environment values as they compare to the estimated mean for all of the plurality of time intervals, wherein the graphical representation represents, for each of the plurality of time intervals, real-time or near real-time environmental data of the respective time interval as a graphical element indicator at a position on the scale within one of the overall data segments to represent how the real-time data value compares to the estimated mean for the distribution of the historical environmental data in order to benchmark the real-time or near real-time environmental data against the historical environmental data; and c) continuously updating the graphical representation based on the additional real-time or near real-time environmental data to move the graphical element indicator to different positions along the scale for the overall data segments to indicate the how the additional real-time data values associated with the time interval compare to the estimated mean in order to provide a continuously real-time or near real-time benchmark against the historical environmental data.

9. The method of claim 8, wherein the historical and real-time or near real-time environmental data relate to resource consumption by the entity and wherein the plurality of historical data values and the real-time data value comprises consumption values.

10. The method of claim 8, wherein the historical and real-time or near real-time environmental data relate to emission generation by the entity and wherein the plurality of historical data values and the real-time data value comprises emission activity data.

11. The method of claim 8, wherein, for each of the plurality of time intervals, the position representing the real-time or near real-time environmental data for the respective time interval indicates how the real-time or near real-time environmental data for the respective time interval compares to an estimated mean of the distribution of the historical environmental data for the respective time interval.

12. The method of claim 8, wherein the overall data segments and the time interval specific data segments for each of the plurality of time intervals comprise a first overall data segment representing a lower than average, a second overall data segment representing an average, and a third overall data segment representing a higher than average.

13. The method of claim 8, wherein the overall data segments and the time interval specific data segments for each of the plurality of time intervals comprise a first overall data segment, a second overall data segment and a third overall data segment, wherein the first overall data segment represents environmental data within the range $X(t') < \mu - (0.491)\sigma$, the second overall data segment represents data within the range $\mu - (0.491)\sigma < X(t') < \mu + (0.491)\sigma$, and the third overall data segment represents environmental activity data within the range $X(t') > \mu + (0.491)\sigma$, where $X(t')$ is an environmental data point, $\mu$ is the estimated mean, and $\sigma$ is the estimated standard deviation.

14. The method of claim 8, wherein determining the distribution for the historical environmental data for the entity comprises determining an empirical distribution for the historical environmental data.

15. A system for generating and updating a graphical user interface for continuous real-time or near real-time benchmarking environmental data for an entity, wherein the system comprises a processor and a storage device storing instructions, the instructions being executable to configure the processor to:

a) determine an approximate normal distribution for historical environmental data for the entity by estimating a mean and a standard deviation, wherein the historical environmental data comprise a plurality of historical data values, wherein each of the plurality of data consumption values is associated with a time interval for a historical date;

generating, using the processor, a graphical representation of data segments, the data segments being approximately equal in size when displayed as part of a graphical user interface, wherein the data segments are generated using the approximate normal distribution for the historical environmental data, the mean and the standard deviation, wherein the data segments represent a scale of environment values as they compare to the estimated mean, each data segment providing boundaries along the scale of environmental values and representing a different range of environmental values, wherein a first data segment represents an average consumption with a first range of data values along the scale, a second data segment represents a less than average consumption with a second range of data values along the scale, and a third data segment represents a greater than average consumption with a third range of data values along the scale, the first range of data values, the second range of data values and the third range of data values being different even though the data segments are approximately equal in size when displayed as part of the graphical user interface such that more common data values are spread out along the scale and less common data values are compacted along the scale;

collecting real-time or near real-time environmental data for the entity to continuously receive a real-time data value associated with the time interval for a real-time date;

generate, using the processor, the graphical user interface for display on a device, wherein the graphical user display comprises a graphical representation benchmarking the real-time or near real-time environmental data against the historical environmental data, wherein the graphical representation illustrates the data segments as approximately equal in size and represents the real-time or near real-time environmental data as a graphical element indicator at a position on the scale within one of the segments to represent how the real-time data value compares to the estimated mean for the distribution of the historical environmental data in order to benchmark the real-time or near real-time environmental data against the historical environmental data;

continuously collect additional real-time or near real-time environmental data for the entity to receive real-time updates as additional real-time data values associated with the time interval for the real-time date; and continuously update the graphical representation based on the additional real-time or near real-time environmental data to move the graphical element indicator to different positions along the scale for the data segments to indicate the how the additional real-time data values associated with the time interval compare to the estimated mean in order to provide a continuously real-time or near real-time benchmark against the historical environmental data.

16. The system of claim 15, wherein the historical and real-time or near real-time environmental data relate to resource consumption by the entity and wherein the plurality of historical data values and the real-time data value comprises consumption values.

17. The system of claim 15, wherein the historical and real-time or near real-time environmental data relate to emission generation by the entity and wherein the plurality of historical data values and the real-time or near real-time data value comprises emission activity data.

18. The system of claim 15, wherein the historical and real-time or near real-time environmental data is associated with a data type and a location.

19. The system of claim 15, wherein the first data segment represents environmental data within the approximate range $X(t') \leq \mu - (0.491)\sigma$, the second data segment represents environmental data within the approximate range $\mu - (0.491)\sigma < X(t') \leq \mu + (0.491)\sigma$, and the third data segment represents environmental data within the approximate range $X(t') > \mu + (0.491)\sigma$, where $X(t')$ is an environmental data point, $\mu$ is the estimated mean, and $\sigma$ is the estimated standard deviation.

20. The system of claim 15, wherein the processor is configured to determine the distribution for the historical environmental data for the entity by determining an empirical distribution for the historical environmental data.

21. A non-transitory computer-readable medium upon which a plurality of instructions are stored, the instructions for performing the steps of the method as claimed in claim 1.

* * * * *